United States Patent
Magariyachi et al.

(10) Patent No.: US 11,159,906 B2
(45) Date of Patent: Oct. 26, 2021

(54) HRTF MEASUREMENT METHOD, HRTF MEASUREMENT DEVICE, AND PROGRAM

(71) Applicant: Sony Corporation, Tokyo (JP)

(72) Inventors: Tetsu Magariyachi, Kanagawa (JP); Yuhki Mitsufuji, Tokyo (JP); Homare Kon, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/466,897

(22) PCT Filed: Nov. 28, 2017

(86) PCT No.: PCT/JP2017/042532
§ 371 (c)(1),
(2) Date: Jun. 5, 2019

(87) PCT Pub. No.: WO2018/110269
PCT Pub. Date: Jun. 21, 2018

(65) Prior Publication Data
US 2020/0068334 A1    Feb. 27, 2020

(30) Foreign Application Priority Data

Dec. 12, 2016   (JP) .............................. JP2016-240352

(51) Int. Cl.
*H04S 7/00*       (2006.01)
*G06T 19/00*      (2011.01)
(Continued)

(52) U.S. Cl.
CPC ................ *H04S 7/303* (2013.01); *G06T 7/70* (2017.01); *G06T 19/006* (2013.01); *H04R 5/02* (2013.01);
(Continued)

(58) Field of Classification Search
CPC ....... H04S 7/303; H04S 2420/01; G06T 7/70; G06T 19/006; G06T 2207/30196;
(Continued)

(56) References Cited

U.S. PATENT DOCUMENTS

| 5,729,612 A | 3/1998 | Abel et al. |
| 2009/0208022 A1 | 8/2009 | Fukui et al. |

(Continued)

FOREIGN PATENT DOCUMENTS

| JP | H0879874 A | 3/1996 |
| JP | 08-307988 A | 11/1996 |

(Continued)

OTHER PUBLICATIONS

Toshima et al., A dummy head that tracks the head motion. NTT Communication Science Laboratories, NTT Corporation. Sep. 2002. pp. 439-440. 8 pages.

(Continued)

*Primary Examiner* — Vivian C Chin
*Assistant Examiner* — Douglas J Suthers
(74) *Attorney, Agent, or Firm* — Wolf, Greenfield & Sacks, P.C.

(57) ABSTRACT

The present technology relates to an HRTF measurement method, an HRTF measurement device, and a program which can more simply acquire a head-related transfer function of an individual.
The HRTF measurement device displays an image indicating a target direction that a user is to face. In a case where a front direction of the user and the target direction are matched, the HRTF measurement device outputs a measurement sound from a speaker and measures an HRTF on the basis of a result of receiving the measurement sound through a microphone mounted on an ear of the user. The present (Continued)

technology can be applied to, for example, a device which measures a head-related transfer function and the like.

14 Claims, 24 Drawing Sheets

(51) Int. Cl.
   *H04R 5/033* (2006.01)
   *G06T 7/70* (2017.01)
   *H04R 5/02* (2006.01)
   *H04R 5/04* (2006.01)

(52) U.S. Cl.
   CPC .............. *H04R 5/033* (2013.01); *H04R 5/04* (2013.01); *G06T 2207/30196* (2013.01); *H04R 2430/20* (2013.01); *H04S 2420/01* (2013.01)

(58) Field of Classification Search
   CPC . H04R 5/02; H04R 5/033; H04R 5/04; H04R 2430/20
   USPC ......................................................... 381/300
   See application file for complete search history.

(56) References Cited

U.S. PATENT DOCUMENTS

| 2016/0119731 A1* | 4/2016 | Lester, III | ................. H04S 7/40 381/59 |
|---|---|---|---|
| 2017/0013389 A1 | 1/2017 | Kitazawa | |

FOREIGN PATENT DOCUMENTS

| JP | 2005-123959 A | 5/2005 |
|---|---|---|
| JP | 2007-251248 A | 9/2007 |
| JP | 2009-194682 A | 8/2009 |
| JP | 2015-233252 A | 12/2015 |
| JP | 2017-016062 A | 1/2017 |
| WO | WO 2014/081384 A1 | 5/2014 |
| WO | 2015/068587 A1 | 5/2015 |
| WO | WO 2016/065137 A1 | 4/2016 |

OTHER PUBLICATIONS

International Search Report and Written Opinion and English translations thereof dated Feb. 27, 2018 in connection with International Application No. PCT/JP2017/042532.

International Preliminary Report on Patentability and English translation thereof dated Jun. 27, 2019 in connection with International Application No. PCT/JP2017/042532.

Extended European Search Report dated Nov. 14, 2019 in connection with European Application No. 17881564.3.

Japanese Office Action dated Aug. 20, 2021 in connection with Japanese Application No. 2018-556541, and English translation thereof.

* cited by examiner

FIG. 16
A
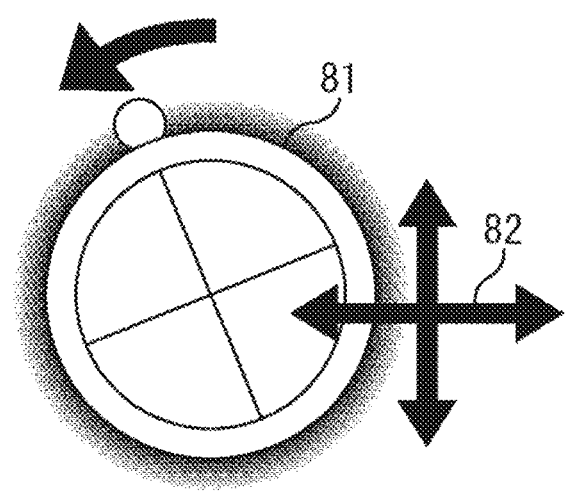
DIRECTION APPROACHES
B
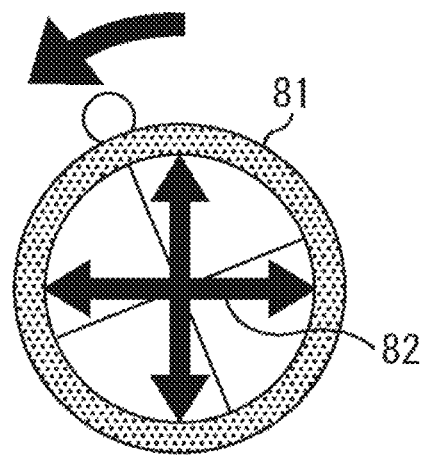
ONLY DIRECTION IS MATCHED
(ROLL IS NOT MATCHED)

FIG. 17
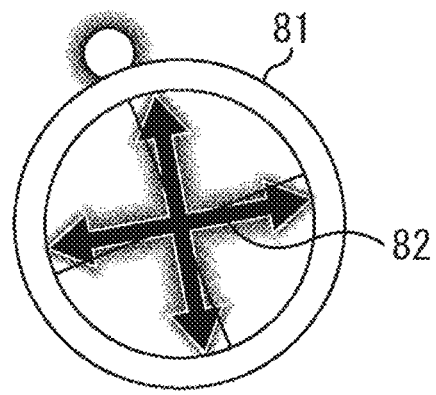
A
ROLL APPROACHES
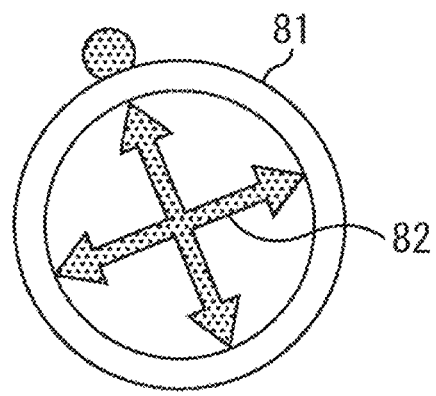
B
ONLY ROLL IS MATCHED
(DIRECTION IS NOT MATCHED)

BOTH DIRECTION/ROLL ARE MATCHED

HRTF MEASUREMENT METHOD, HRTF MEASUREMENT DEVICE, AND PROGRAM

CROSS-REFERENCE TO RELATED APPLICATIONS

This application claims the benefit under 35 U.S.C. § 371 as a U.S. National Stage Entry of International Application No. PCT/JP2017/042532, filed in the Japanese Patent Office as a Receiving Office on Nov. 28, 2017, which claims priority to Japanese Patent Application Number JP2016-240352, filed in the Japanese Patent Office on Dec. 12, 2016, each of which is hereby incorporated by reference in its entirety.

TECHNICAL FIELD

The present technology relates to an HRTF measurement method, an HRTF measurement device, and a program, and particularly to an HRTF measurement method, an HRTF measurement device, and a program which can more simply acquire a head-related transfer function of an individual.

BACKGROUND ART

In recent years, recording, transmitting, and reproducing of spatial information from the surroundings are developed and come into use in the voice fields. At the super high definition, a three-dimensional multi-channel sound of 22.2 channels is planned for broadcasting. Furthermore, in the field of virtual reality, signals surrounding the entire circumference are reproduced in voice as well in addition to images surrounding the entire circumference.

As a method of reproducing sound information from the whole periphery, a method of arranging speakers around the whole periphery is considered. However, it is considered that the sound information is limited to movie theaters, large-scale facilities, and the like from the aspect of installation scale and cost, but is not able to be provided to ordinary homes. A binaural reproduction technique using a headphone is attracting attention.

This binaural reproduction technique is commonly referred to as an auditory display (hereinafter referred to as a virtual auditory display (VAD)), and is realized using a head-related transfer function (HRTF).

The head-related transfer function expresses information associated with sound transmission from every direction surrounding a human head up to both eardrums as a function of a frequency and an incoming direction. In a case where an HRTF from a predetermined direction is synthesized with a target voice, and posted through a headphone, a listener is perceived not as if the sound arrived from the headphone but from the direction of the HRTF used. The auditory display (VAD) is a system using such a principle.

If virtual speakers are realized using the auditory display, the reproduction using a number of speaker array systems which are actually difficult in practice can be realized by the posting through the headphone.

However, the characteristics of the head-related transfer function used in the auditory display are determined by reflection and refraction of an auricula and a head. Therefore, an individual difference is caused by a difference in auriculae or head shapes. Therefore, the use of the head-related transfer function of an individual is important for correct perception and localization of a sound field.

In order to acquire of the head-related transfer function of an individual, for example, there is a measurement method using the spherical speaker array and the like (for example, see Patent Document 1).

CITATION LIST

Patent Document

Patent Document 1: Japanese Patent Application Laid-Open No. 2007-251248

SUMMARY OF THE INVENTION

Problems to be Solved by the Invention

However, a measurement method using the spherical speaker array and the like has a problem in practical use because a large-scaled device is required and the cost is increased.

The present technology has been made in view of such situations, and an object thereof is to simply acquire a head-related transfer function of an individual.

Solutions to Problems

An HRTF measurement method according to an aspect of the present technology includes: displaying, by an HRTF measurement device, an image indicating a target direction that a user is to face; and in a case where a front direction of the user and the target direction are matched, outputting a measurement sound from a speaker to measure an HRTF on the basis of a result of receiving the measurement sound through a microphone mounted on an ear of the user.

An HRTF measurement device according to an aspect of the present technology includes: a display control unit which displays an image indicating a target direction that a user is to face; and an HRTF measurement unit which outputs a measurement sound from a speaker in a case where a front direction of the user and the target direction are matched, and measures an HRTF on the basis of a result of receiving the measurement sound through a microphone mounted on an ear of the user.

A program according to an aspect of the present technology causes a computer to execute a process including: displaying an image indicating a target direction that a user is to face; and in a case where a front direction of the user and the target direction are matched, outputting a measurement sound from a speaker to measure an HRTF on the basis of a result of receiving the measurement sound through a microphone mounted on an ear of the user.

According to an aspect of the present technology, an HRTF measurement device displays an image indicating a target direction that a user is to face. In a case where a front direction of the user and the target direction are matched, a measurement sound is output from a speaker to measure an HRTF on the basis of a result of receiving the measurement sound through a microphone mounted on an ear of the user.

Further, the program may be provided by transmission through the transmission medium, or recorded in a recording medium.

The HRTF measurement device may be an independent device, or may be an inner block which is a component of one device.

Effects of the Invention

According to an aspect of the present technology, a head-related transfer function of an individual can be more simply acquired.

Further, the effects described herein are not necessarily limited, and may be any one of the effects described in the present disclosure.

BRIEF DESCRIPTION OF DRAWINGS

FIG. 16 is a diagram illustrating a feedback display example of a degree of matching related to a direction.

FIG. 17 is a diagram illustrating a feedback display example of a degree of matching related to a roll.

MODE FOR CARRYING OUT THE INVENTION

Hereinafter, modes (hereinafter, referred to as embodiments) for carrying out the present technology will be described. Further, the description will be given in the following order.
1. Binaural Reproduction Technique
2. Experimental Result to Verify Effects of Head-Related Transfer Function of User Himself (Herself)
3. First Embodiment of HRTF Measurement System
4. Second Embodiment of HRTF Measurement System
5. Modifications
6. Configuration Example of Computer <1. Binaural Reproduction Technique>

First, a binaural reproduction technique using the head-related transfer function (HRTF) will be simply described.

As described above, the head-related transfer function expresses information associated with sound transmission from every direction surrounding a human head up to both eardrums as a function of a frequency and an incoming direction.

Figure 1:
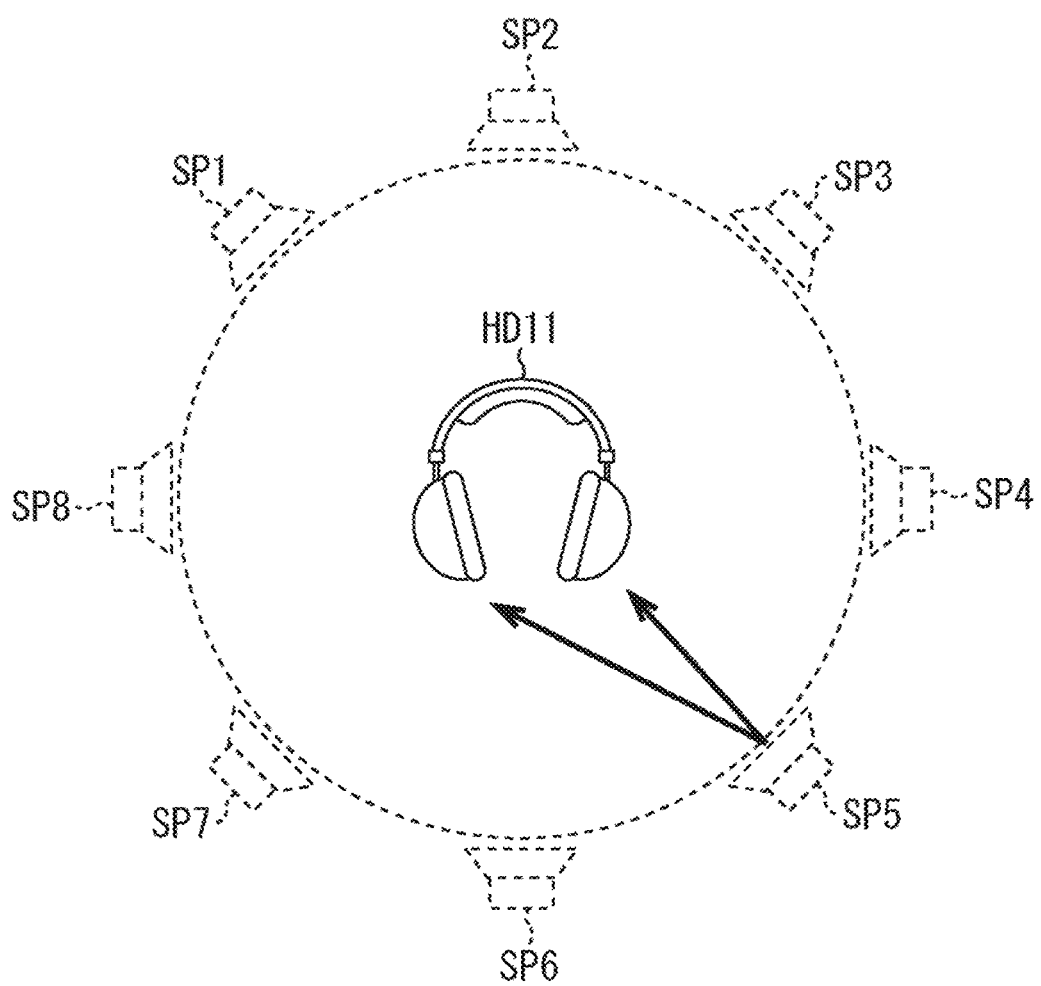
FIG. 1 is a diagram for describing a binaural reproduction technique.

As illustrated in FIG. 1, in a case where a headphone HD11 presents a combined HRTF from a predetermined direction with respect to a target sound, a listener (hereinafter, simply referred to as a user) feels the sound coming not from the headphone HD11 but from the direction of the HRTF, for example, any one of speakers SP1 to SP8 disposed around the user instead of the headphone HD11.

Technically defining, the head-related transfer function $H(x, \omega)$ is obtained by normalizing a transfer characteristic $H_1(x, \omega)$ from a sound source position x to an eardrum position of the user in a state where the user's head is in a free space with a transfer characteristic $H_0(x, \omega)$ from the sound source position x to a head center O in a state where the head is not in the free space. In other words, the head-related transfer function $H(x, \omega)$ with respect to the sound source position x is obtained by the following Expression (1).

[MATH. 1]

$$H(x, \omega) = \frac{H_1(x, \omega)}{H_0(x, \omega)} \tag{1}$$

If the head-related transfer function $H(x, \omega)$ is overlapped with any sound signal and presented through the headphone and the like, it is possible to give an illusion to the user as if the sound is heard from a direction of the overlapped head-related transfer function $H(x, \omega)$, that is, the direction of the sound source position x.

Further, in a case where the sound is measured in an echoing room for example, instead of the free space, the echoes are contained together with the HRTF. Such a case is generally called a binaural room impulse response (BRIR). However, in this specification, HRTF or the head-related transfer function will be collectively used, if not otherwise mentioned, regardless of whether or not it is the free space and whether or not the normalization is performed by $H_0(x, \omega)$.

The head-related transfer function $H(x, \omega)$ differs depending on an individual difference caused by a difference between auriculae or head shapes. Therefore, it is desirable that an individual head-related transfer function $H(x, \omega)$ is measured for each user.

<2. Experimental Result to Verify Effects of Head-Related Transfer Function of User Himself (Herself)>

Figure 2:
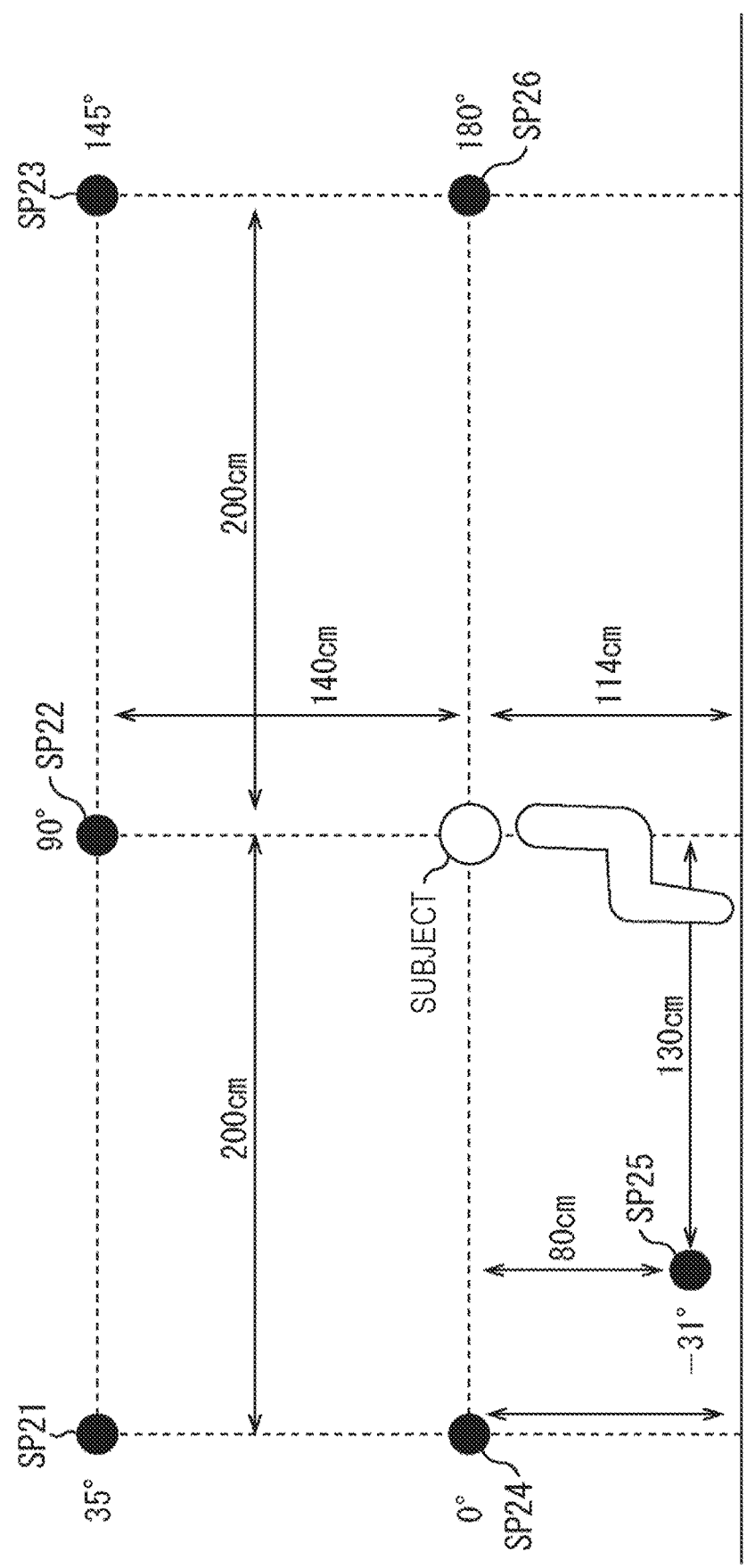
FIG. 2 is a diagram for describing an experimental result to verify an effect of the head-related transfer function of a user himself (herself).
Figure 3:
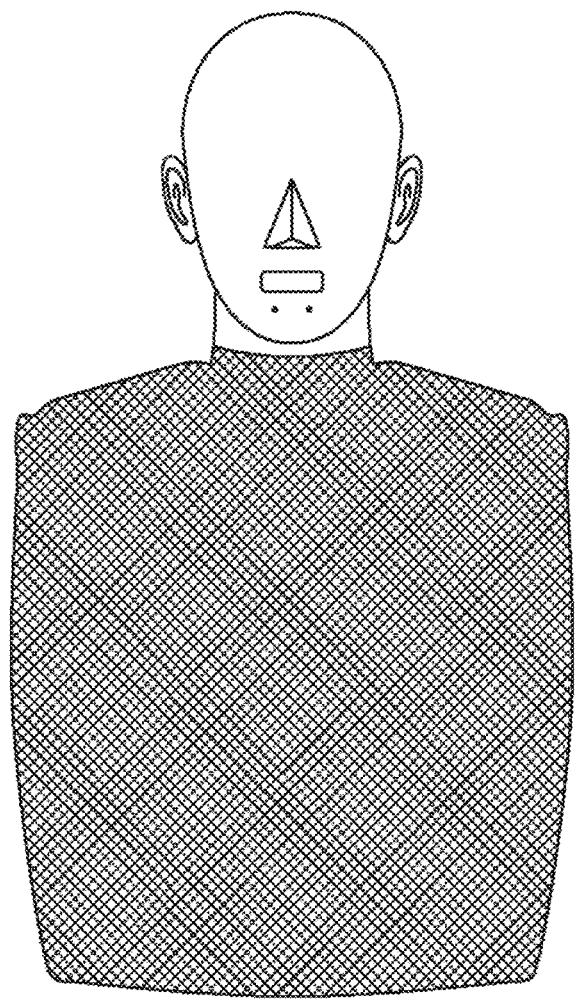
FIG. 3 is a diagram for describing an experimental result to verify an effect of the head-related transfer function of the user himself (herself).
Figure 4:
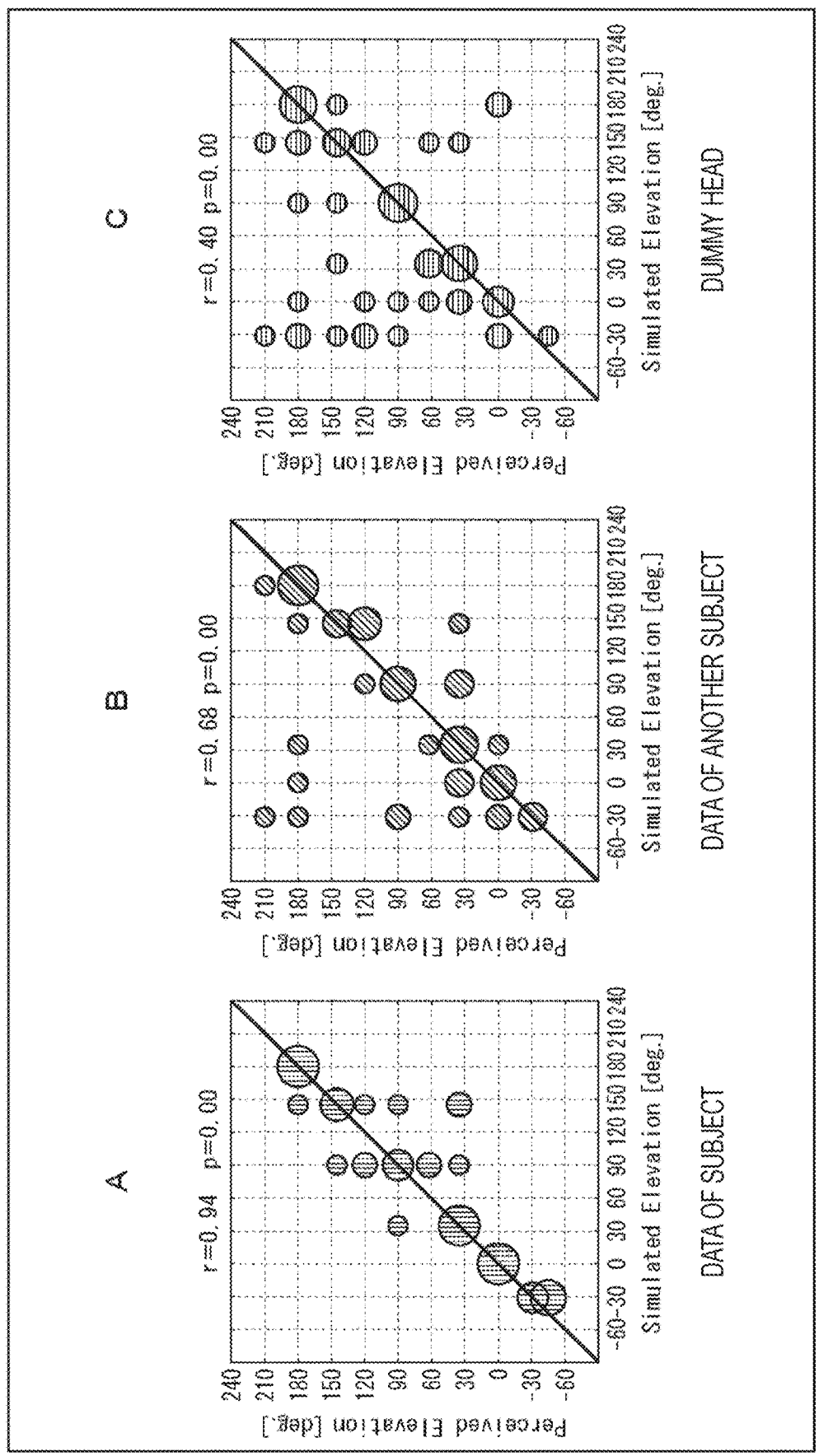
FIG. 4 is a diagram for describing an experimental result to verify an effect of the head-related transfer function of the user himself (herself).

An experimental result of the HRTF effect dedicated to the user will be described with reference to FIGS. 2 to 4 compared to a case where the user himself (herself) and an HRTF of another user are considered.

FIG. 2 is a diagram illustrating an experiment situation.

In the experiment, ten users are made to be subjects, and the speakers SP21 to SP26 are located at various positions (directions) from the subjects. The HRTF dedicated to the user himself (herself) from the speakers to the subjects are measured. In addition, as an average HRTF of the users, the HRTF is also measured by a dummy head (HATS: Head and Torso Simulator, 4100, made by B&K) as illustrated in FIG. 3.

A procedure of an evaluation experiment is as follows.

The subject listens to a sound as a correct direction where the sound is output from each of the speakers SP21 to SP26.

Next, the subject wears the headphone, listens to a test stimulus, and responds to a localized direction (the direction of each of the virtual speakers SP21 to SP26). As the test stimulus, the subject listens to three types of test stimuli: a test stimulus in which the HRTF of the subject is overlapped to a music signal, a test stimulus in which the HRTF of another subject is overlapped, and the HRTF of the dummy head is overlapped. Herein, as the HRTF of the other subject, the HRTF of the last subject when ten subjects are tested sequentially. The first subject is tested using the HRTF of the last (tenth) subject.

FIG. 4 is a graph illustrating a result of the evaluation experiment.

A of FIG. 4 illustrates a response result in a case where the user listens to the test stimulus overlapped with the user's HRTF.

B of FIG. 4 illustrates a response result in a case where the user listens to the test stimulus overlapped with the other HRTF.

C of FIG. 4 illustrates a response result in a case where the user listens to the test stimulus overlapped with the HRTF of the dummy head.

In the graphs in A to C of FIG. 4, the horizontal axis represents a presented stimulus, and the vertical axis represents a response. The size of circle in the graph is proportional to the number of times of responses. The slanted line in the graph illustrates the straight line of y=x. As the response approaches the straight line, the localization can be made accurately.

As can be seen from the response results of A to C of FIG. 4, it is found that the stimulus using the user's HRTF can be localized accurately.

As described above, it is extremely useful to measure the HRTF dedicated to the user.

Figure 5:
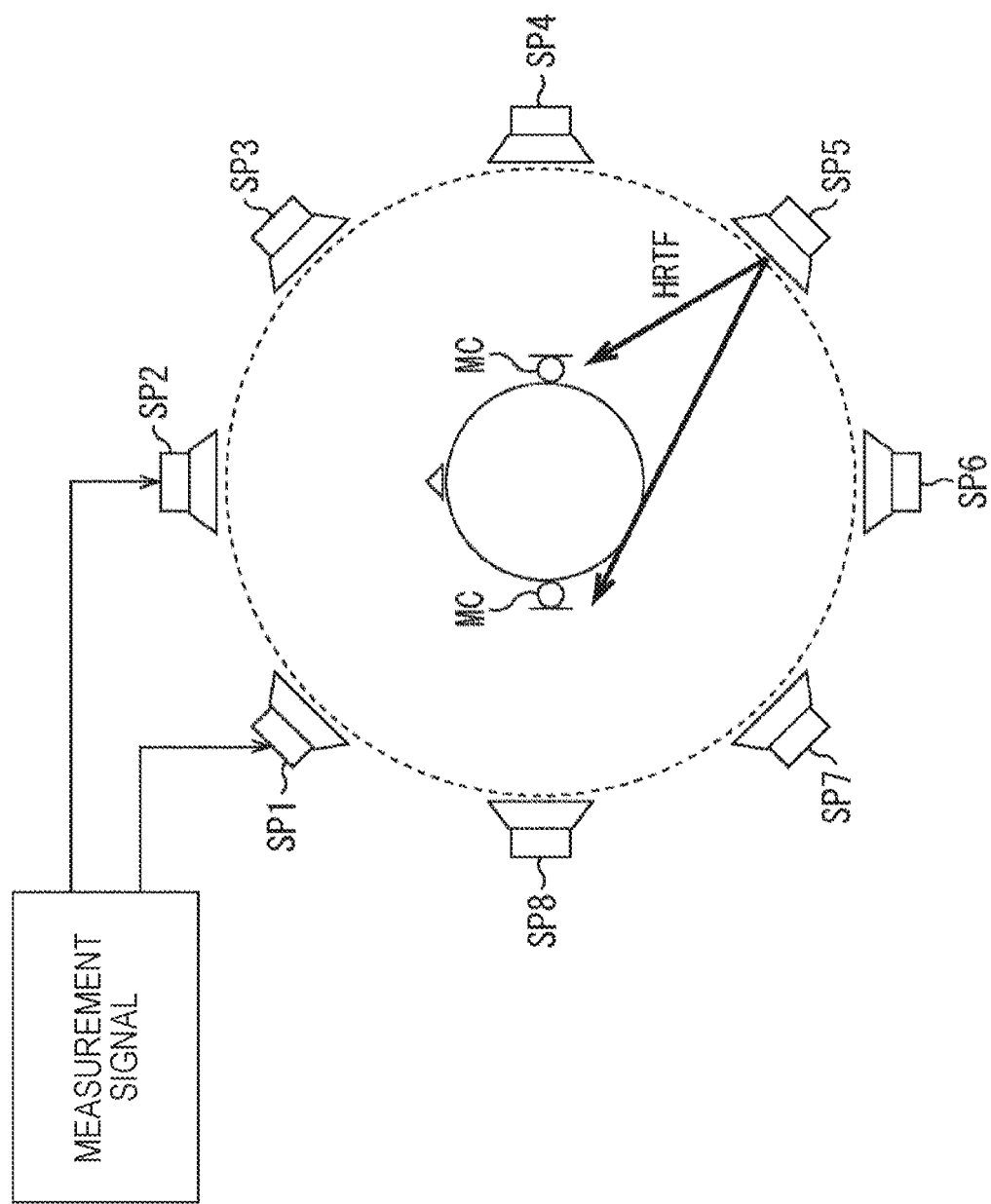
FIG. 5 is a diagram for describing another measurement method of a head-related transfer function.

By the way, as a method of measuring the HRTF, as illustrated in FIG. 5, the user is made to sit at the center of a spherical speaker array where the speakers SP1 to SP8 are actually disposed, and the user wears a microphone MC in an ear canal entrance. In this state, a measurement signal sound such as a time stretched pulse (TSP) is sequentially output from each of the speakers SP1 to SP8 for measurement.

Figure 6:
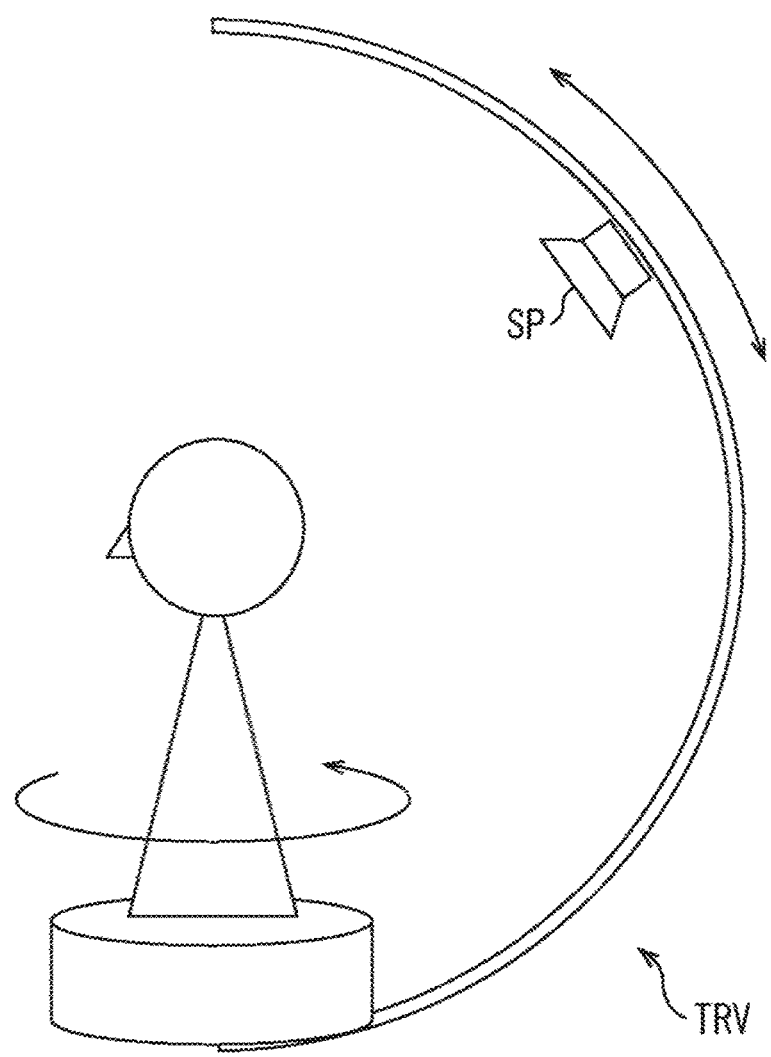
FIG. 6 is a diagram for describing another measurement method of the head-related transfer function.

Alternatively, as illustrated in FIG. 6, there is a measurement method in which the measurement signal sound is output in each place while moving the speaker SP using a traverse device TRV to make the speaker SP draw a locus on the spherical surface.

However, these methods are suitable to a large-scaled measurement system. Therefore, there is a need a method of measuring the HRTF with a simple configuration.

<3. First Embodiment of HRTF Measurement System>

In the following, the description will be given about an HRTF measurement system for realizing that the head-related transfer function (HRTF) is measured with a simple configuration.

<System Configuration Example>

Figure 7:
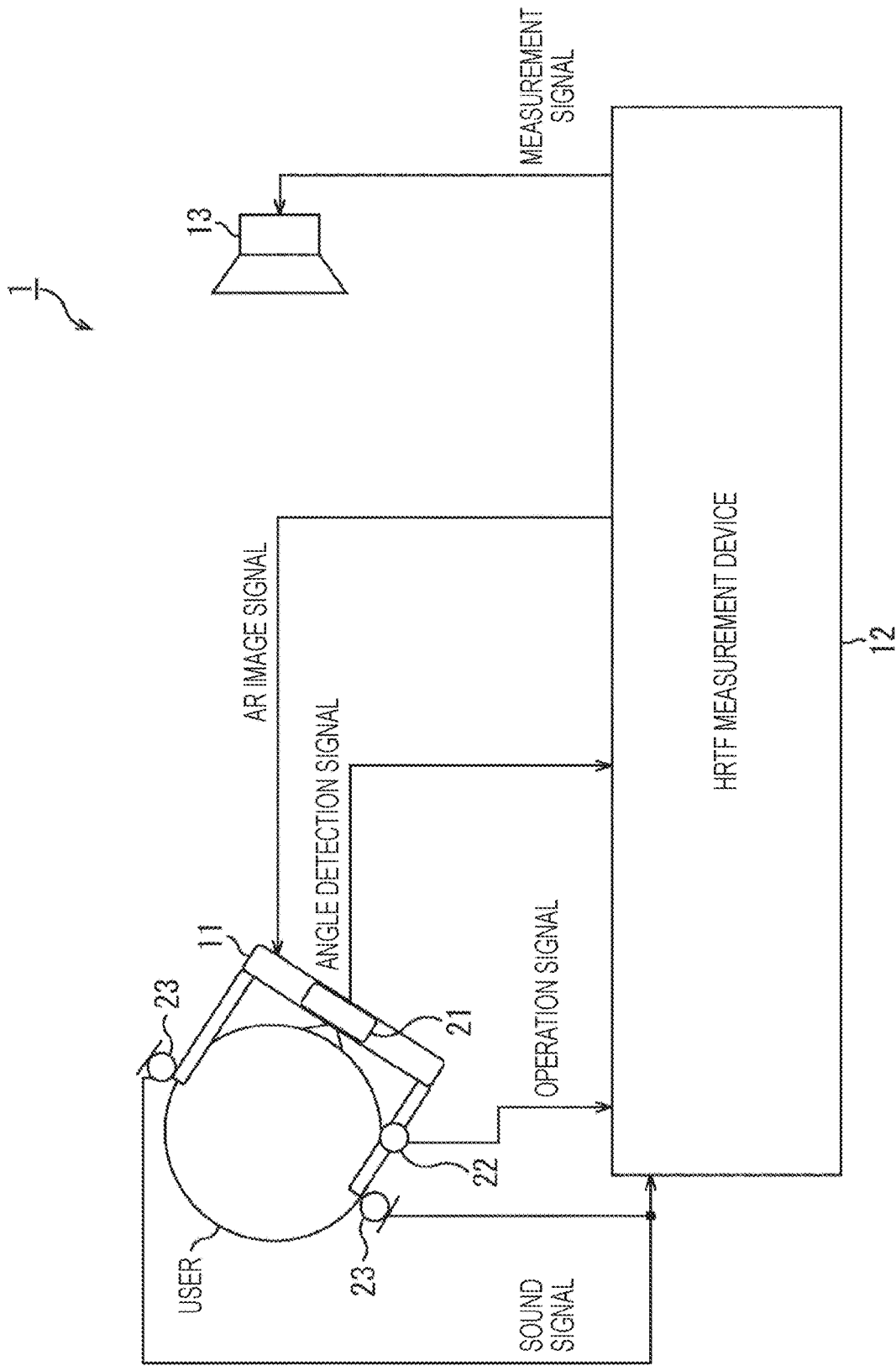
FIG. 7 is a diagram illustrating a configuration of a first embodiment of an HRTF measurement system to which the present technology is applied.

FIG. 7 illustrates a configuration of a first embodiment of the HRTF measurement system to which the technology of the present disclosure is applied.

An HRTF measurement system 1 illustrated in FIG. 7 is configured by AR glasses 11, an HRTF measurement device 12, and a speaker 13.

The AR glasses 11 are glasses which can display an augmented reality (AR) image. The user (subject) who measures the HRTF wears the glasses. The AR glasses 11 display a predetermined AR image within the field of view of the user on the basis of an AR image signal supplied from the HRTF measurement device 12.

The AR glasses 11 include an angle sensor 21, an operation button 22, and a microphone 23.

The angle sensor 21 is configured by, for example for example, a gyro sensor (angular velocity sensor), an acceleration sensor, an inertial sensor, a geomagnetic sensor and the like, and is used as a sensor to detect an angle (direction) and a rotation operation of the user's head with the AR glasses 11. The angle sensor 21 supplies an angle detection signal indicating a detected angle to the HRTF measurement device 12.

The operation button 22 is configured by, for example, a pressing button, and receives a user's operation to detect a predetermined timing. The operation button 22 supplies an operation signal corresponding to a detected user's operation to the HRTF measurement device 12.

The microphone 23 is worn in the user's ear, and detects an ambient sound. The microphone 23 detects a sound (measurement sound) for the HRTF measurement which is output from the speaker 13, and supplies a sound signal corresponding to a detected measurement sound to the HRTF measurement device 12. The microphone 23 may have a noise canceling function.

The HRTF measurement device 12 makes the speaker 13 output the measurement sound, and acquires the sound signal of the measurement sound detected by the microphone 23 to calculate (measure) the HRTF dedicated to the user.

More specifically, the HRTF measurement device 12 supplies the AR image signal to the AR glasses 11 to display the AR image (guide image) when the HRTF is measured, and displays the AR image in the AR glasses 11. The user moves to a predetermined position (direction) toward the speaker 13 according to the AR image displayed in the AR glasses 11. When it is detected that the user moves to the predetermined position on the basis of the angle detection signal supplied from the angle sensor 21, the HRTF measurement device 12 supplies the measurement signal to the speaker 13 to make the speaker 13 output the measurement sound, and acquires the sound signal of the measurement sound detected by the microphone 23 to calculate (measure) the HRTF dedicated to the user.

The speaker 13 outputs the measurement sound on the basis of the measurement signal supplied from the HRTF measurement device 12.

Further, in this embodiment, the angle sensor 21, the operation button 22, and the microphone 23 have been described as being integrally formed to the AR glasses 11 as part of the AR glasses 11. However, these components may be configured separately from the AR glasses 11.

<Procedure of HRTF Measurement>

A procedure of the HRTF measurement of the HRTF measurement system 1 will be described with reference to FIG. 8.

The HRTF measurement device 12 is configured such that the user takes a turn with respect to one fixed speaker 13 to measure the HRTF at a plurality of measurement angles instead of disposing the plurality of speakers 13 at various angels.

The HRTF measurement device 12 includes a list (hereinafter, referred to as target list) that stores a direction that the user is to face, the direction corresponding to the angle of the HRTF intended to be measured. In the following, the angle of the HRTF intended to be measured will be called a target angle, and a direction that the user is to face will be called a target direction.

Figure 8:
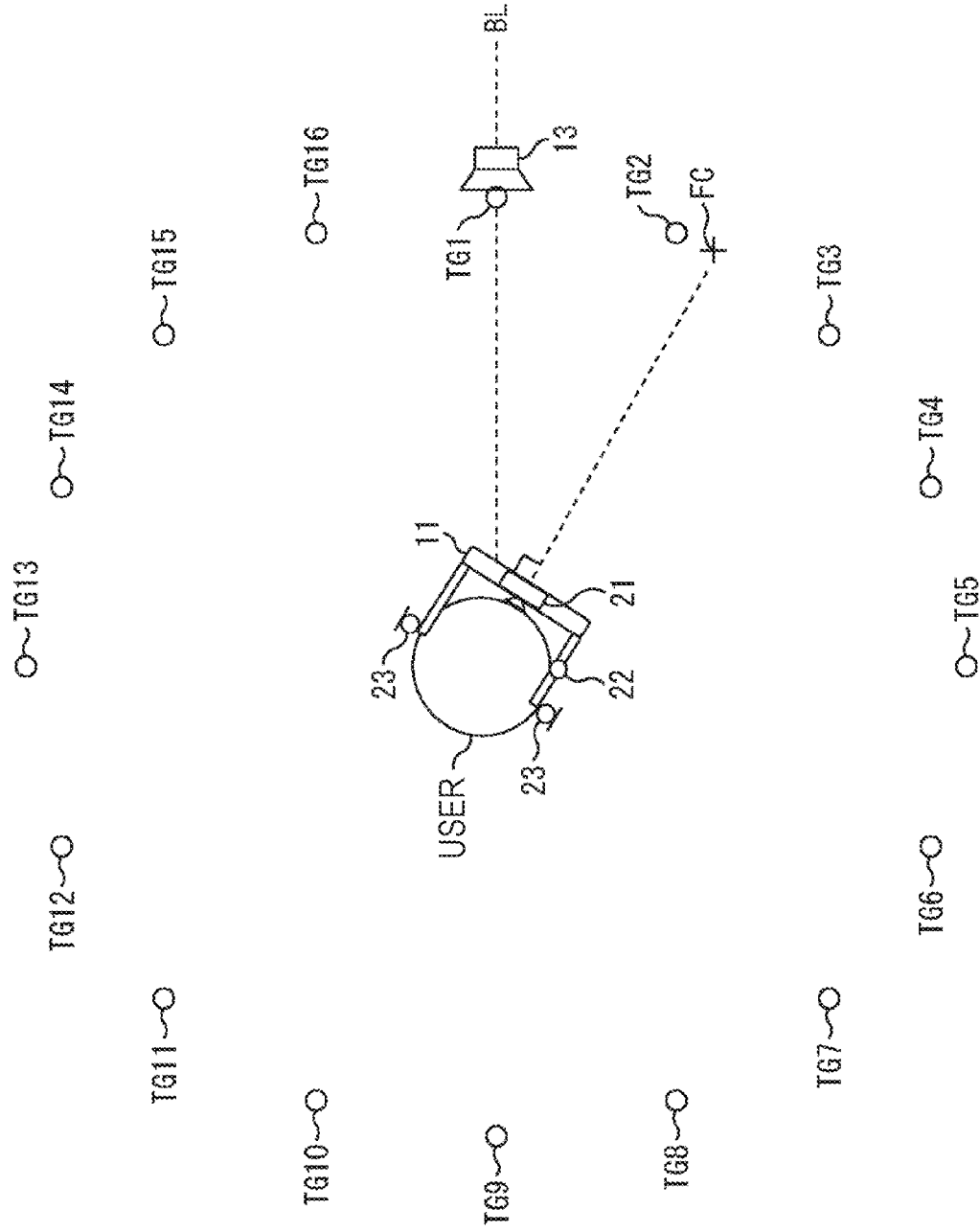
FIG. 8 is a diagram for describing a procedure of the HRTF measurement.

FIG. 8 illustrates an example in a case where the target list includes sixteen targets TG in target directions TG1 to TG16.

In this embodiment, for the sake of simplicity in the description, only a horizontal plane passing the user's head (ear) will be considered. The sixteen target directions TG1 to TG16 are on a circumference with the distance between the user and the speaker 13 as a diameter on the horizontal plane passing the user's head (ear). In the sixteen target directions TG1 to TG16, a direction BL (hereinafter, referred to as reference direction BL) for reference of the position (direction) of the speaker 13 is set.

For example, in a case where the HRTF at 90 degree on the right side of the user is measured, the user needs to face toward the direction of 90 degrees on the left of the speaker 13. Therefore, the target direction in a case where the target angle is 90 degrees on the right becomes 90 degrees on the left.

In this way, if any one of the target angle and the target direction is determined, the other one is determined. Therefore, only the target direction that the user is to face is stored in the target list in this embodiment when the HRTF is measured.

Further, only the target direction TG may be stored in the target list. However, both the target direction TG and the corresponding target angle may be stored. On the contrary, a plurality of target angles may be stored in the target list.

The HRTF measurement device 12 sets the reference direction BL on the basis of a user's operation, and then sets the plurality of target directions TG on the basis of the target list.

For example, if the user wears the AR glasses 11, a message such as "Face the speaker" is displayed as the AR image. The user faces the speaker 13, and presses the operation button 22. The HRTF measurement device 12 detects the pressing of the operation button 22, sets the currently facing direction of the user to the reference direction BL as a direction where the speaker 13 is, and confirms the sixteen target directions TG1 to TG16.

The HRTF measurement device 12 displays a front direction FC of the user and the AR image indicating the target direction TGn (any one of n=1 to 16) that the user is to face in the AR glasses 11.

Then, in a case where the front direction FC of the user and the target direction TGn that the user is to face are matched to each other on the basis of the angle detection signal supplied from the angle sensor 21, the HRTF measurement device 12 makes the speaker 13 output the measurement sound, and acquires a signal (hereinafter, referred to as sound signal) of the measurement sound detected by the microphone 23 to measure the HRTF dedicated to the user in the target direction TGn.

The above process is performed sequentially on the target directions TG1, TG2, TG3, and so on to measure the HRTFs of the sixteen target directions TG1 to TG16.

As described above, according to the HRTF measurement system 1, the user takes a turn instead of disposing the plurality of speakers 13 at various angles. Therefore, the HRTF of the entire target angle can be measured even if only one speaker 13 is fixed.

Further, in the HRTF measurement system 1 of this embodiment, the AR glasses 11 are used. However, a VR head mount display using a virtual reality (VR) technology may be similarly used instead of the AR glasses 11.

However, in a case where the VR head mount display is used, the user is not able to view the speaker 13 in the state of wearing the VR head mount display. Thus, for example, a voice message such as "Wear the VR head mount display toward the speaker" is output from the speaker 13. When being ready, the user presses the operation button 22 to set the reference direction BL, and can confirm the sixteen target directions TG1 to TG16.

Alternatively, a sensor is provided in the speaker 13 to detect the VR head mount display, and the HRTF measurement device 12 displays the position (the reference direction BL) of the speaker 13 as a VR image on the basis of the detection result of the sensor, and guides the user to move such that the speaker 13 displayed as the VR image is in the front direction.

<Block Diagram of Detailed Configuration of HRTF Measurement System>

Figure 9:
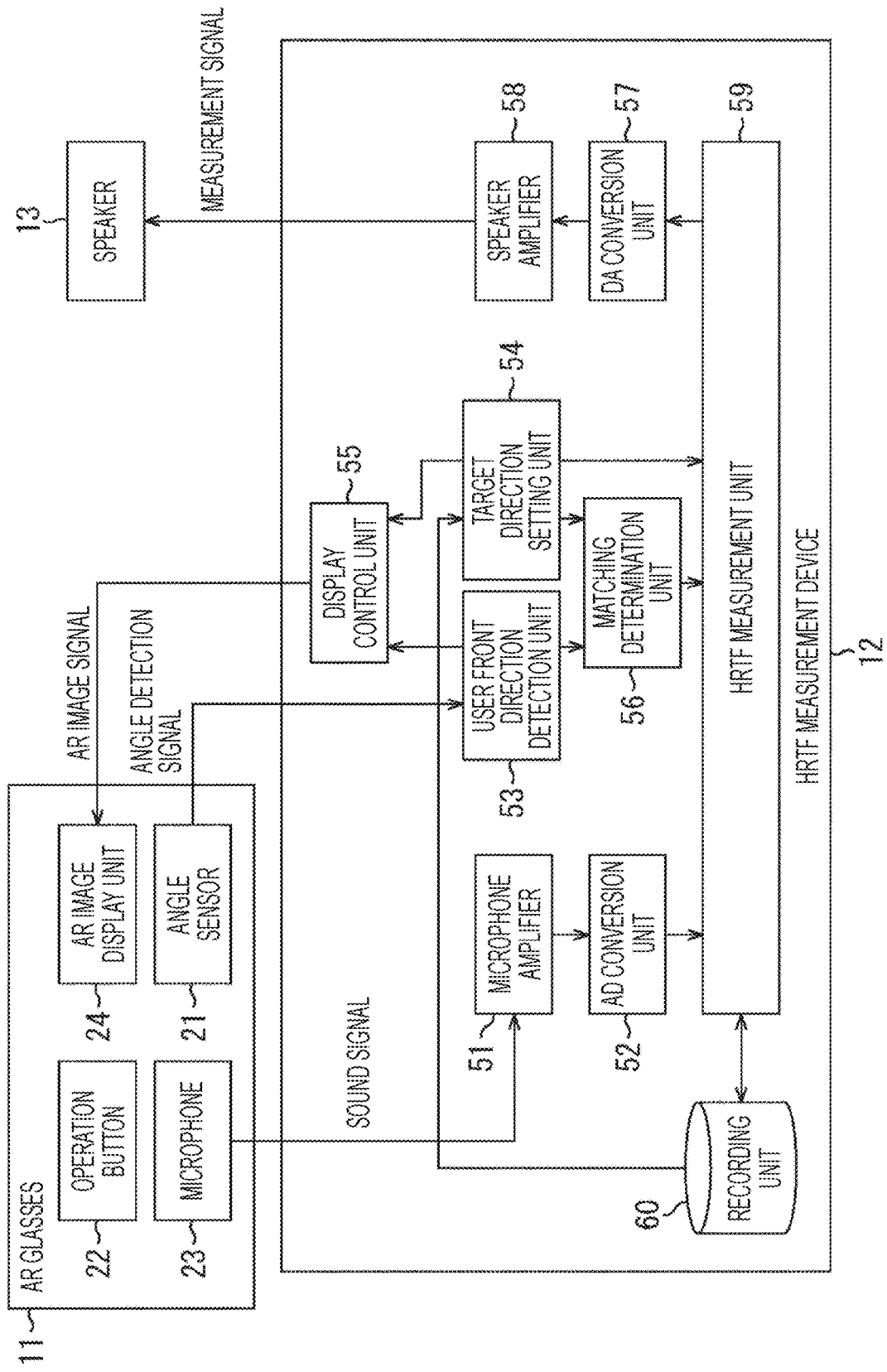
FIG. 9 is a block diagram illustrating a detailed configuration of the HRTF measurement system of the first embodiment.

FIG. 9 is a block diagram illustrating a detailed configuration of the AR glasses 11, the HRTF measurement device 12, and the speaker 13 which are included in the HRTF measurement system 1.

Further, in FIG. 9, the portion corresponding to the above-described portions will be attached with the same symbol, and the description thereof will be appropriately omitted.

In the AR glasses 11, an AR image display unit 24 is added in addition to the angle sensor 21, the operation button 22, and the microphone 23. The AR image display unit 24 displays the AR image on the basis of the AR image signal supplied from the HRTF measurement device 12.

The HRTF measurement device 12 includes a microphone amplifier 51, an AD conversion unit 52, a user front direction detection unit 53, a target direction setting unit 54, a display control unit 55, a matching determination unit 56, a DA conversion unit 57, a speaker amplifier 58, an HRTF measurement unit 59, and a recording unit 60.

The microphone amplifier 51 amplifies an analog sound signal supplied from the microphone 23 and supplies the signal to the AD conversion unit 52. The AD conversion unit 52 converts the analog sound signal supplied from the microphone amplifier 51 into a digital sound signal (AD conversion), and supplies the digital signal to the HRTF measurement unit 59.

The user front direction detection unit 53 detects (calculates) the front direction FC of the user on the basis of the angle detection signal supplied from the angle sensor 21 of the AR glasses 11, and supplies the front direction to the display control unit 55 and the matching determination unit 56.

The target direction setting unit 54 acquires the target list recorded in the recording unit 60, sets the target direction TG of the user on the basis of the acquired target list, and supplies the target direction to the display control unit 55, the matching determination unit 56, and the HRTF measurement unit 59.

The display control unit 55 generates the AR image in which the front direction FC and the target direction TG of the user are displayed with predetermined drawings and marks on the basis of the front direction FC of the user supplied from the user front direction detection unit 53 and the target direction TG of the user supplied from the target direction setting unit 54, and supplies the AR image signal to the AR image display unit 24. The AR image has a function as a guide image to guide the facing direction of the user to the target direction TG. The operation signal output from the operation button 22 of the AR glasses 11 is supplied to the display control unit 55, the HRTF measurement unit 59, and the like.

The matching determination unit 56 determines whether the facing direction of the user and the target direction TG are matched on the basis of the front direction FC of the user supplied from the user front direction detection unit 53 and the target direction TG of the user supplied from the target direction setting unit 54, and supplies the determination result to the HRTF measurement unit 59.

The speaker amplifier 58 amplifies the analog measurement signal supplied from the DA conversion unit 57, and supplies the measurement signal to the speaker 13. The DA conversion unit 57 converts the digital measurement signal supplied from the HRTF measurement unit 59 into the analog measurement signal (DA conversion), and supplies the analog measurement signal to the speaker amplifier 58. Herein, examples of the measurement signal include a time stretched pulse (TSP) signal and the like.

In a case where a determination result indicating that the facing direction of the user is matched to the target direction TG is supplied from the matching determination unit 56, the HRTF measurement unit 59 supplies the measurement signal acquired from the recording unit 60 to the DA conversion unit 57. With this configuration, in a case where the facing direction of the user is matched to the target direction TG, the measurement sound is output from the speaker 13.

In addition, the HRTF measurement unit 59 acquires the sound signal of the measurement sound supplied from the AD conversion unit 52, calculates an impulse response (HRTF) by performing analysis using an inverse function, and records the impulse response in the recording unit 60.

The recording unit 60 is configured by, for example, a hard disk drive (HDD), a semiconductor memory or the like, and records data required for measuring the HRTF. Specifically, the recording unit 60 stores, for example, the target list in which a plurality of target directions TG with respect to the reference direction BL is listed, sound data (measurement signal) of the measurement sound, and the HRTF of each target direction TG of each user created on the basis of the measurement sound acquired by the microphone 23.

The AR glasses 11, the HRTF measurement device 12, and the speaker 13 are configured as described above.

Further, a control signal, a sound signal, or an image signal exchanged between the AR glasses 11, the HRTF measurement device 12, and the speaker 13 may be transferred by a wired communication using a high-definition multimedia (HDMI, registered trademark) cable, a universal serial bus (USB) cable or the like, or may be transferred by a wireless communication such as Bluetooth (registered trademark) or a Wi-Fi.

In addition, the HRTF measurement device 12 may be integrally configured to any one of the AR glasses 11 or the speaker 13.

<Flowchart of HRTF Measurement Process>

Figure 10:
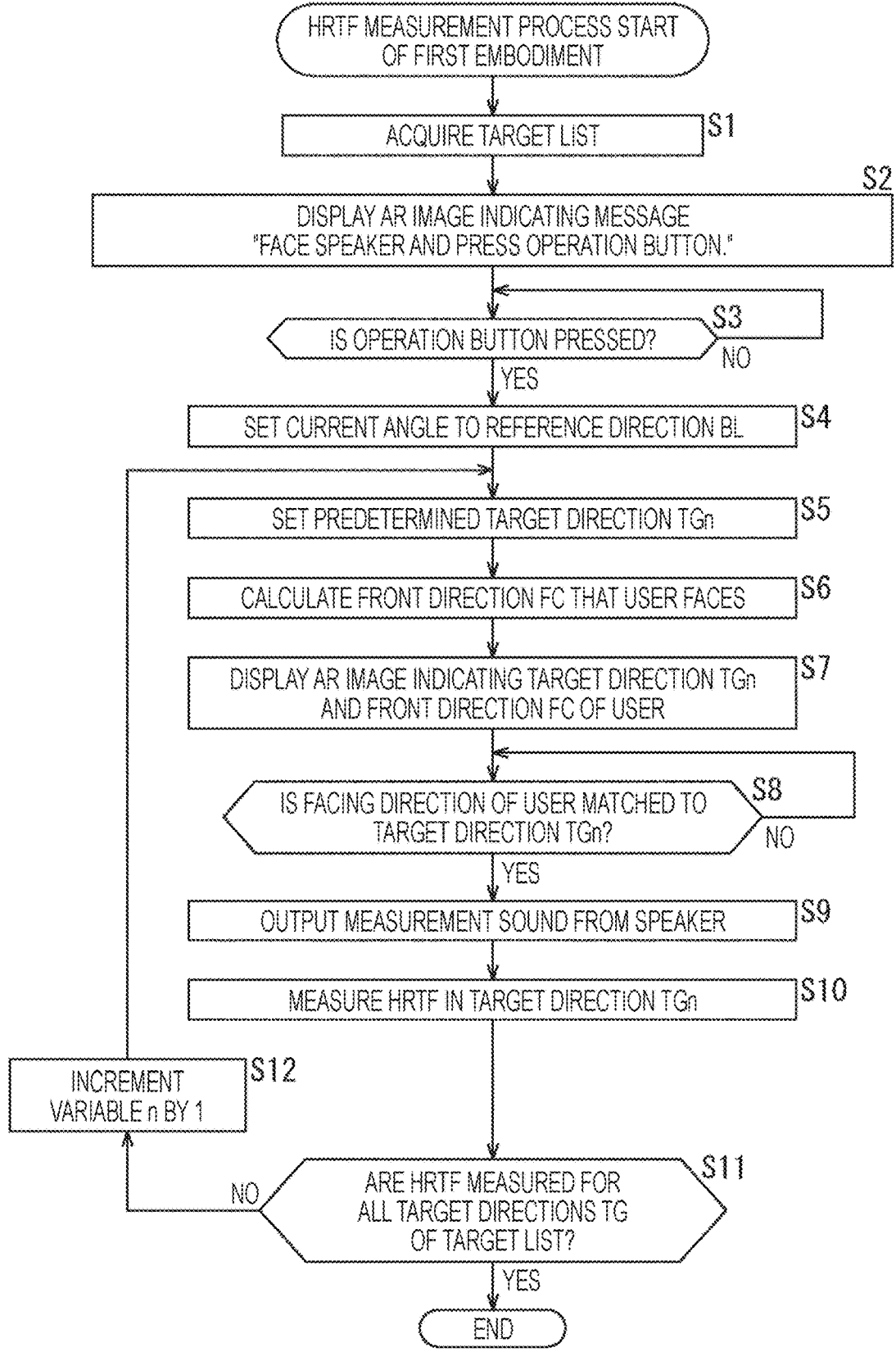
FIG. 10 is a flowchart for describing an HRTF measurement process of the first embodiment.

Next, an HRTF measurement process of the HRTF measurement system 1 according to the first embodiment will be described with reference to a flowchart of FIG. 10. This process starts, for example, when the user (measurement subject) wears the AR glasses 11 and presses the operation button 22 to give an instruction on the start of measurement.

First, in step S1, the target direction setting unit 54 acquires the target list recorded in the recording unit 60.

In step S2, the display control unit 55 supplies the AR image signal indicating a message "Face the speaker and press the operation button" to the AR image display unit 24 of the AR glasses 11. With this configuration, the AR image display unit 24 of the AR glasses 11 displays the AR image which displays the message "Face the speaker and press the operation button".

In step S3, the display control unit 55 determines whether the operation button is pressed on the basis of the operation signal from the AR glasses 11, and is on standby until it is determined that the operation button 22 is pressed.

Then, in a case where it is determined in step S3 that the operation button 22 is pressed, the process proceeds to step S4. The display control unit 55 sets the current angle (direction) indicated by the angle detection signal supplied from the angle sensor 21 to the reference direction BL.

In step S5, the target direction setting unit 54 sets a predetermined target direction TGn (n=1, 2, 3, . . . ) on the basis of the acquired target list.

Further, in step S5 immediately after the reference direction BL is set, a variable n to designate the predetermined target direction TGn among the plurality of target directions TG listed in the target list is set to 1. Therefore, in the first step S5, the target direction TG1 is set.

In step S6, the user front direction detection unit 53 calculates the front direction FC of the user on the basis of the angle detection signal supplied from the angle sensor 21 of the AR glasses 11, and supplies the front direction to the display control unit 55 and the matching determination unit 56.

In step S7, the display control unit 55 generates the AR image indicating the target direction TGn and the front direction FC of the user on the basis of the set target direction TGn and the front direction FC of the user supplied from the user front direction detection unit 53, and supplies the AR image signal to the AR image display unit 24. The AR image display unit 24 of the AR glasses 11 displays the AR image which indicates the target direction TG and the front direction FC of the user.

In step S8, the matching determination unit 56 determines whether the facing direction of the user is matched to the target direction TGn on the basis of the front direction FC of the user supplied from the user front direction detection unit 53 and the target direction TGn of the user which is set by the target direction setting unit 54.

In step S8, in a case where it is determined that an angle difference between the front direction FC and the target direction TGn of the user falls within a predetermined range, it is determined that the facing direction of the user and the target direction TGn are matched.

In step S8, in a case where it is determined that the facing direction of the user is not matched to the target direction TGn, the process returns to step S8. With this configuration, the AR image indicating the front direction FC of the user and the target direction TG is updated until it is determined that the facing direction of the user is matched to the target direction TGn, and displayed in the AR glasses 11.

Then, in step S8, in a case where it is determined that the facing direction of the user is matched to the target direction TGn, the process proceeds to step S9. The matching determination unit 56 supplies the determination result indicating the matching to the HRTF measurement unit 59. The HRTF measurement unit 59 outputs the measurement sound from the speaker 13. In other words, the HRTF measurement unit 59 supplies the measurement signal acquired from the recording unit 60 to the DA conversion unit 57. The measurement signal is subjected to the DA conversion and amplified, supplied to the speaker 13, and output from the speaker 13 as the measurement sound.

Next, in step S10, the HRTF measurement unit 59 acquires the sound signal of the measurement sound detected by the microphone 23 of the AR glasses 11, and measures the HRTF in the target direction TGn. In other words, the HRTF measurement unit 59 acquires the sound signal of the measurement sound supplied through the microphone amplifier 51 and the AD conversion unit 52 from the microphone 23 of the AR glasses 11, and calculates the impulse response by performing analysis using an inverse function, and records the impulse response in the recording unit 60.

In step S11, the HRTF measurement unit 59 determines whether the HRTF is measured for all the target directions TG of the target list.

In step S11, in a case where it is determined that the HRTF is not measured for all the target directions TG of the target list, the process proceeds to step S12. The target direction setting unit 54 increments the variable n designating the target direction TGn by 1. Thereafter, the process returns to step S5. In step S5, the updated target direction TGn is set, and the subsequent processes are repeated.

On the other hand, in a case where it is determined in step S11 that the HRTF is measured for all the target directions TG of the target list, the HRTF measurement process ends.

The HRTF measurement system 1 performs the HRTF measurement process as described above, so that a desired HRTF can be measured only using one fixed speaker 13.

With this configuration, the HRTF of all the periphery dedicated to an individual can be simply acquired only by one speaker 13. Therefore, it is possible to more simply acquire the HRTF of an individual.

In the above-described HRTF measurement process, the HRTF measurement (the output of the measurement sound) starts automatically in a case where the facing direction of the user is matched to the target direction TGn. However, the HRTF measurement may start at a timing when the operation button 22 is pressed by the user to make the button operated. In this case, the user can determine a measurement start timing.

In addition, the movement of the user's head is monitored during the HRTF measurement in the above-described HRTF measurement process. In a case where any of a displacement, a speed, an acceleration, and the like is deviated from a predetermined range, the measurement may be corrected.

In the above example, the plurality of target directions TG measuring the HRTF is set by reading the target list recorded in the recording unit 60. However, an operation unit such as a keyboard or a touch panel may be used for the user to input.

<Display Example of AR Image>

Next, a display example of the AR image displayed in the AR glasses 11 in the HRTF measurement process of the first embodiment will be described.

Figure 11:
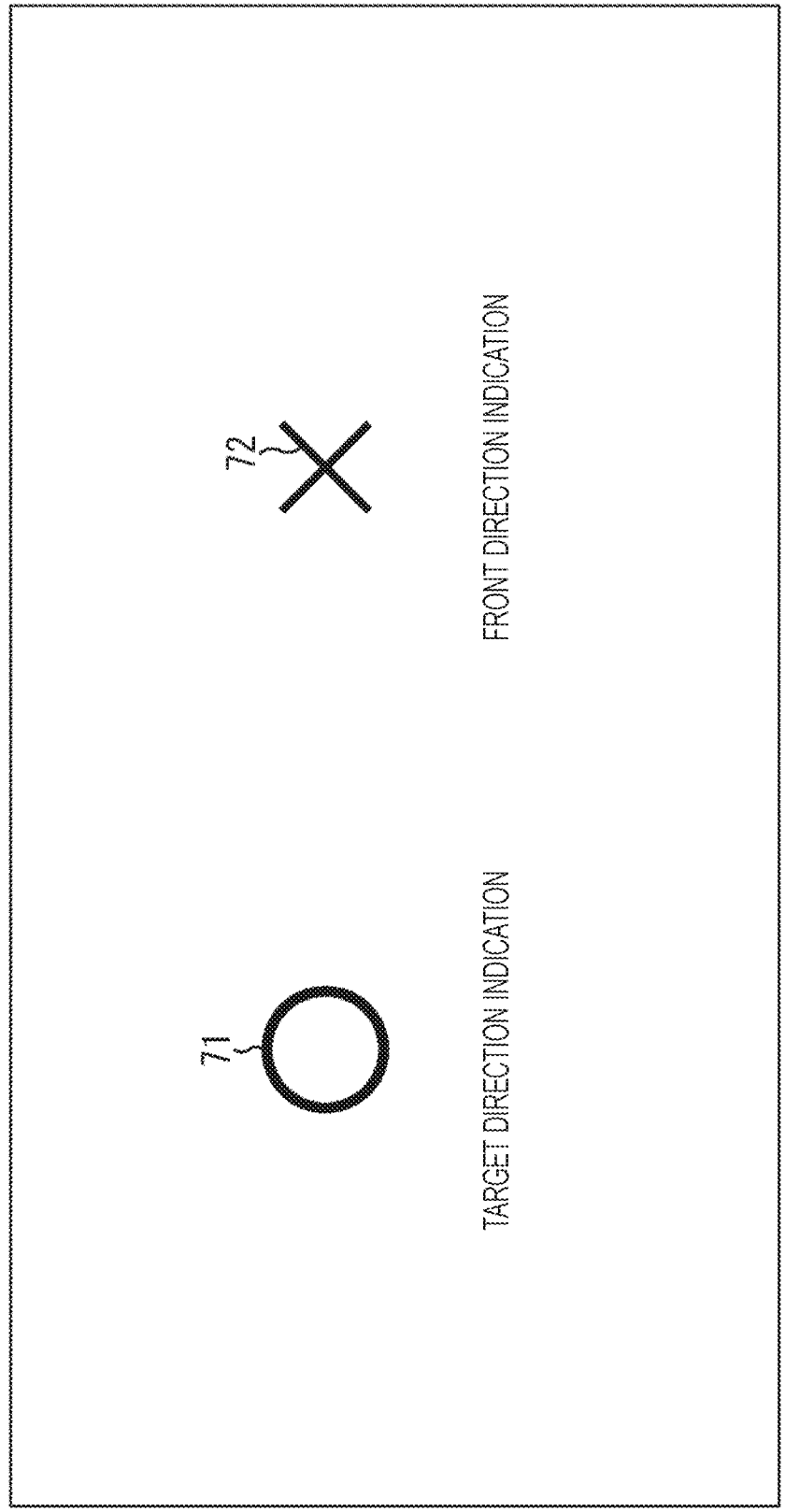
FIG. 11 is a diagram illustrating images in a front direction and a target direction of the user.

FIG. 11 illustrates an example of the image indicating the target direction TG and the image indicating the front direction FC of the user which are displayed in the AR image indicating the target direction TG and the front direction FC of the user in a case where the user is made to face in predetermined the target direction TG.

For example, as illustrated in FIG. 11, an image 71 indicating the target direction TG is displayed with a circle mark "○" (image), and an image 72 indicating the front direction FC of the user is displayed with a cross mark "×" (image).

Figure 12:
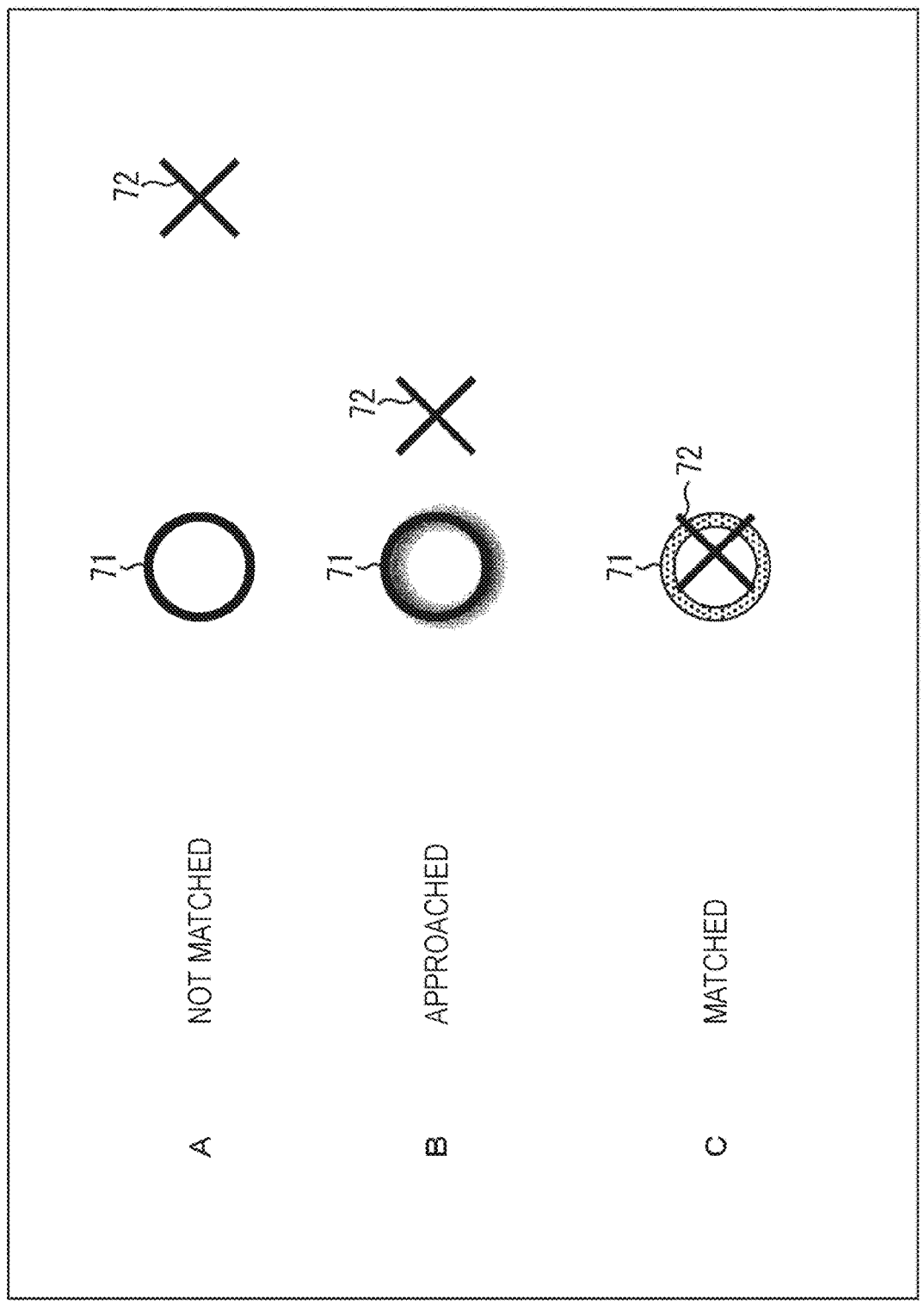
FIG. 12 is a diagram illustrating a display example according to a difference between the front direction of the user and the target direction.

Then, in a case where a difference in angle (angle difference) between the current front direction FC of the user and the target direction TG is larger than a predetermined range, the image 71 indicating the target direction TG and the image 72 indicating the front direction FC of the user are displayed as illustrated in A of FIG. 12. In a case where the difference in angle between the current front direction FC of the user and the target direction TG falls within a first range R1, the display of the image 71 indicating the target direction TG is changed to a display indicating that the current front direction FC of the user is close to the first range R1 with respect to the target direction TG as illustrated in B of FIG. 12. In B of FIG. 12, the image 71 indicating the target direction TG is changed to be displayed with shadow (gradation) to display that the image approaches the first range R1.

Then, in a case where the different in angle between the current front direction FC of the user and the target direction TG falls within a second range R2 (First Range R1>Second Range R2), and the current front direction FC of the user is matched to the target direction TG, the display of the image 71 indicating the target direction TG is further changed to a display indicating that the current front direction FC of the user is matched to the target direction TG as illustrated in C of FIG. 12. In C of FIG. 12, the image 71 indicating the target direction TG is displayed such that the color in the circle (inner circumference) is changed to a predetermined color (for example, black to red) different from a normal color as a display indicating that the current front direction FC of the user is matched to the target direction TG.

In this way, in the AR image inducing the facing direction of the user toward the target direction TG, it is possible to present a state of approaching to the target direction TG by changing the display (color or symbol) of the image 71 indicating the target direction TG according to the difference in angle between the current front direction FC of the user and the target direction TG to the user.

Further, in the example of FIG. 12, the display of the image 71 indicating the target direction TG is changed according to the angle difference between the front direction FC of the user and the target direction TG. However, on the contrary, the display of the image 72 indicating the front direction FC of the user may be changed.

In a case where the target direction TG is within a field of view in the current front direction FC of the user, as illustrated in FIG. 12, the image 71 indicating the target direction TG and the image 72 indicating the front direction FC of the user can be displayed at the same time.

However, in a case where the target direction TG is out of the field of view of the user, for example, a straight backward direction, the image 71 indicating the target direction TG is not possible to be displayed, and the user is not aware of which direction is the target direction TG.

Figure 13:
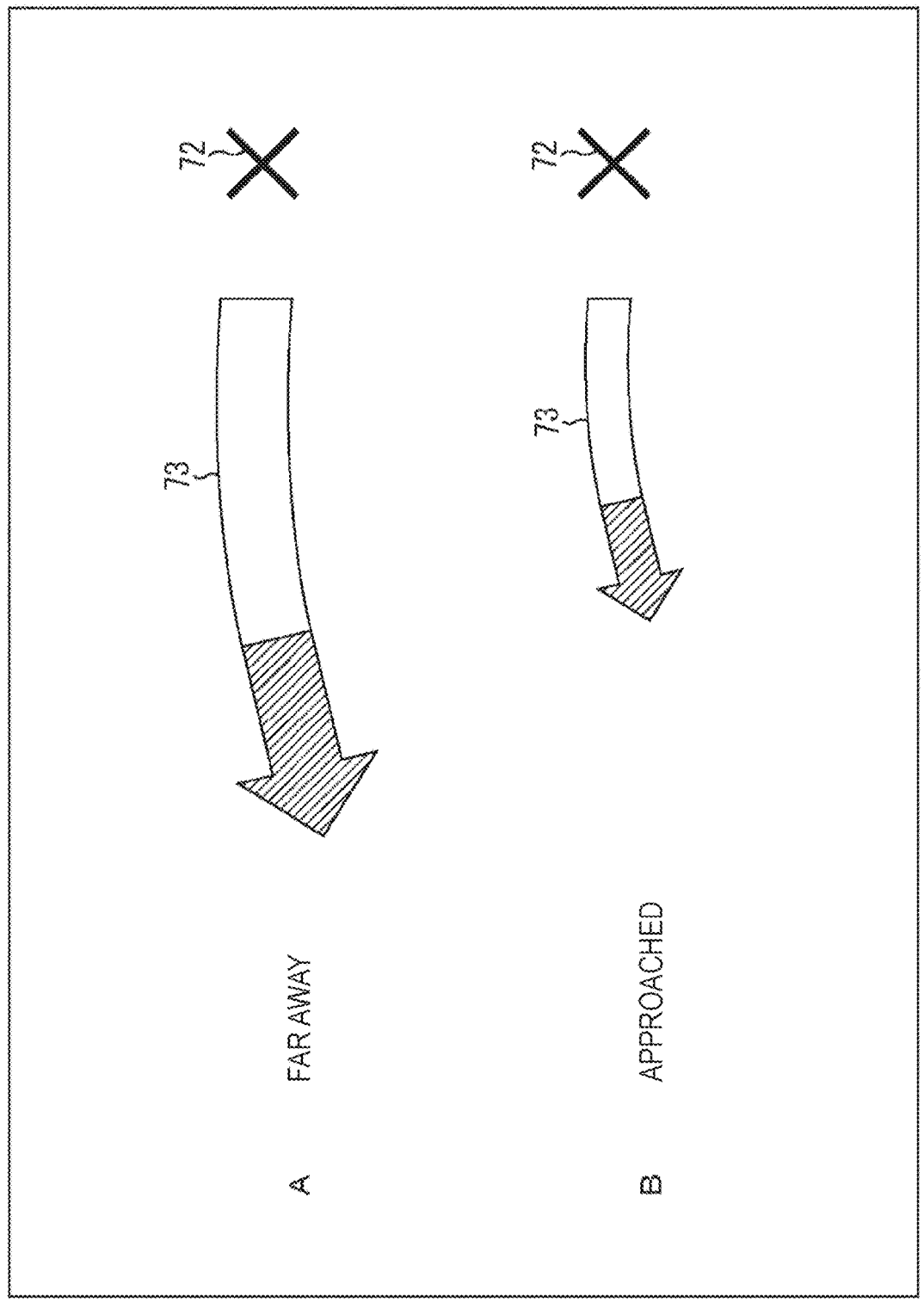
FIG. 13 is a diagram illustrating a display example in a case where the target direction is out of a field of view.

Then, in a case where the target direction TG is out of the field of view of the user, the display control unit 55 displays an inducing image 73 to induce the user to the target direction TG instead of the image 71 indicating the target direction TG, for example, as illustrated in FIG. 13. The inducing image 73 is expressed by an arc arrow of a predetermined curvature in order to be distinguished from an arrow 142 of the vertical and lateral directions described later in FIG. 23.

A of FIG. 13 illustrates an example of the inducing image 73 in a case where the target direction TG is out of the field of view of the user and far away, that is, a case where the angle difference between the current front direction FC of the user and the target direction TG is larger than a third range R3.

B of FIG. 13 illustrates an example of the inducing image 73 in a case where the target direction TG is out of the field of view of the user and close thereto, that is, a case where the angle difference between the current front direction FC of the user and the target direction TG is larger than a fourth range R4 and falls within the third range R3 (Third Range R3>Fourth Range R4).

In A and B of FIG. 13, the inducing image 73 is expressed by an arrow indicating a rotation direction. As the angle difference between the front direction FC of the user and the target direction TG is increased, the length of the arrow is displayed long.

The length of the arrow of the inducing image 73 may be displayed to change in proportion to the angle difference between the front direction FC of the user and the target direction TG, or may be displayed by switching in a plurality stages.

Figure 14:
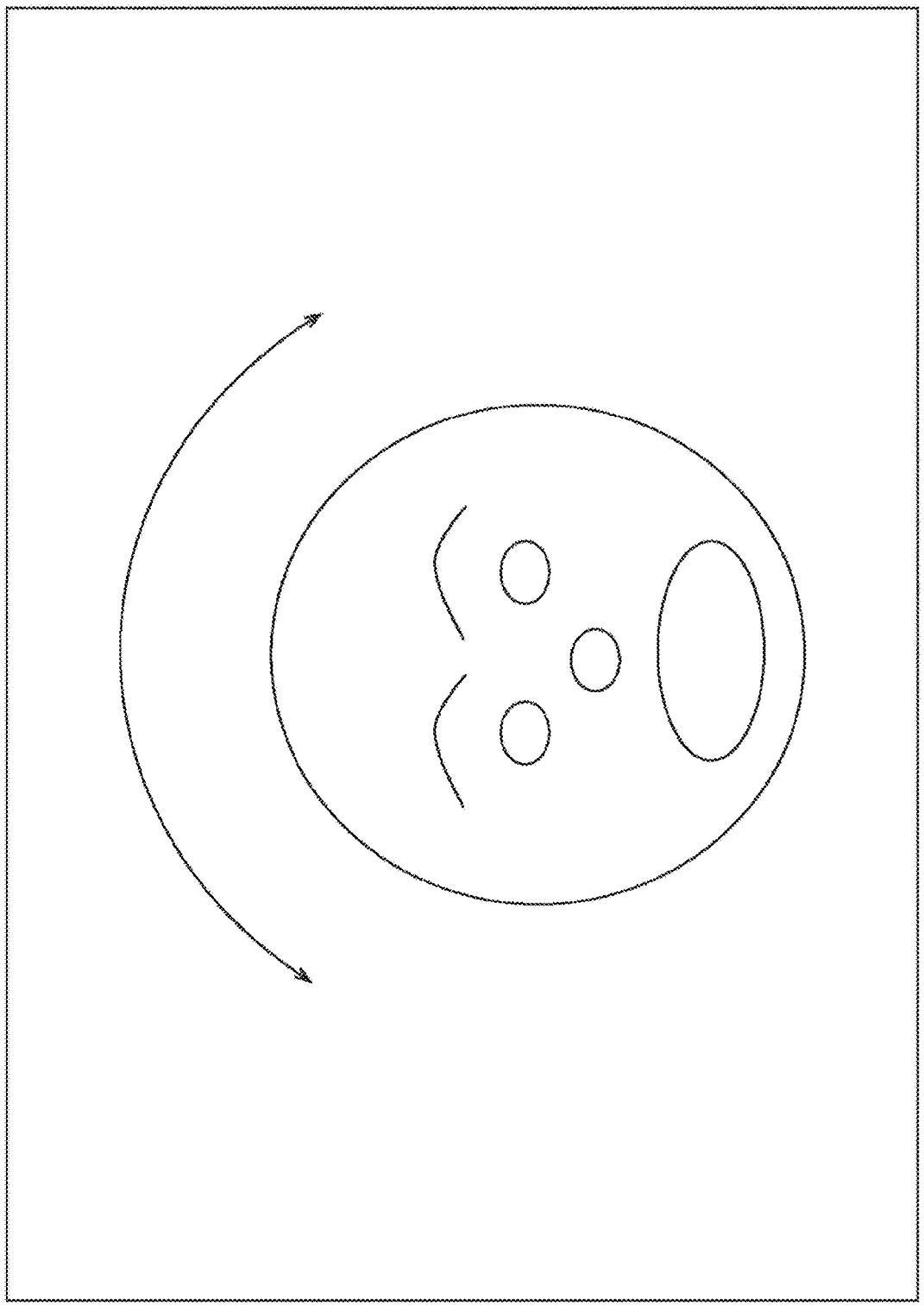
FIG. 14 is a diagram for describing a roll.

Further, there may be a case where the tilt (roll) of the head of the user in the horizontal direction is not horizontal as illustrated in FIG. 14. Therefore, the AR image including information (roll information) associated with the tilt of the head in the horizontal direction may be displayed in the AR glasses 11.

Figure 15:
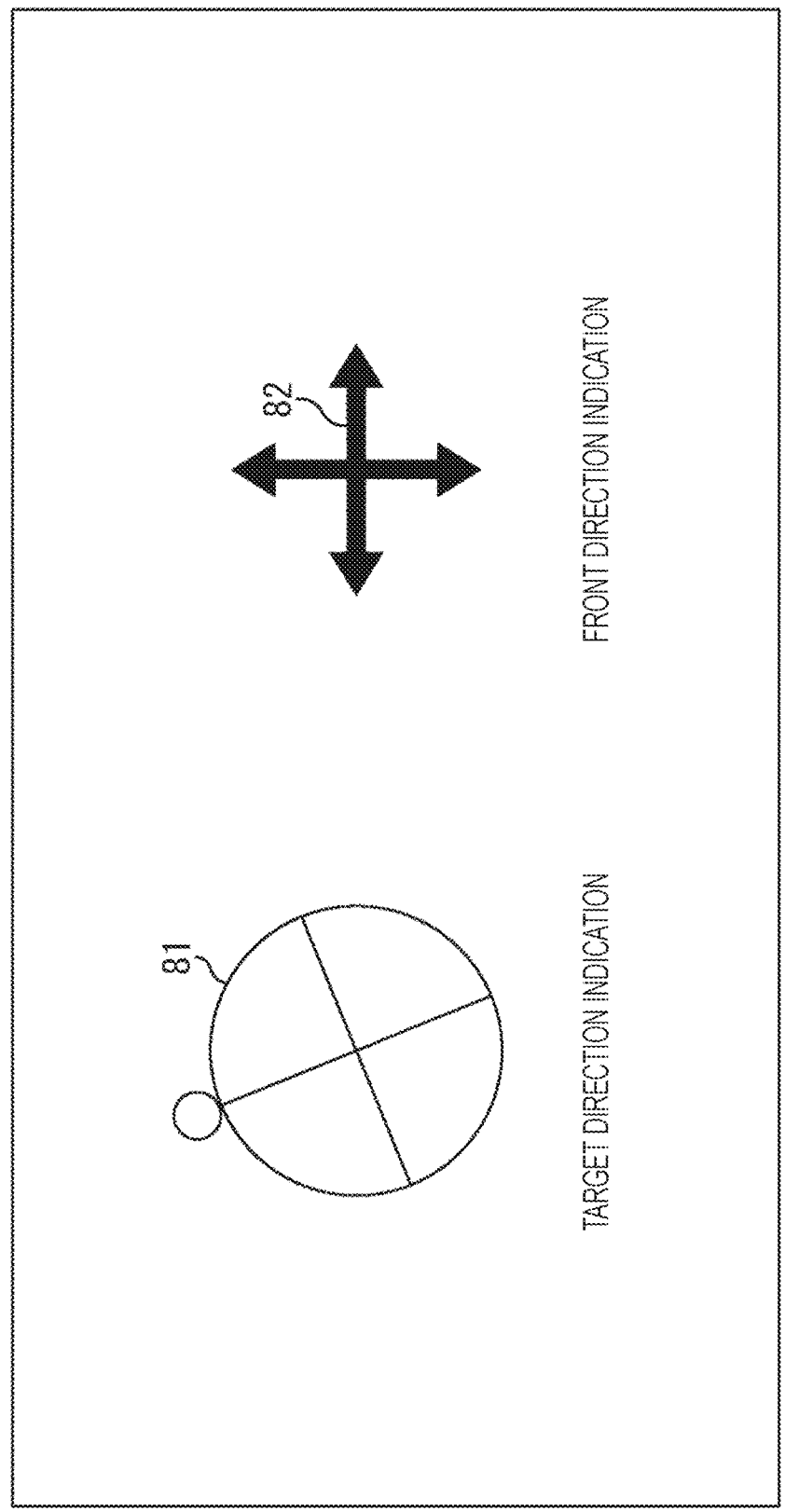
FIG. 15 is a diagram illustrating images indicating the front direction of the user and the target direction, the image including roll information.

FIG. 15 illustrates an image indicating the target direction TG and the image indicating the front direction FC of the user in a case where the tilt of the head in the horizontal direction is also included.

In a case where the target direction TG is displayed including the tilt of the head in the horizontal direction, there is a need to display to indicate the up, down, right, and left directions. For example, an image 81 indicating the target direction TG is displayed by an image in which circle (large circle) drawn with a cross therein and a circle (small circle) smaller than the large circle are adjacent (circumscribed) to each other as illustrated in FIG. 15. In this case, the direction of the small circle represents the upper portion (the upper portion of the head). The example of FIG. 15 corresponds to a display for the user to change the tilt of the head in the horizontal direction to a tilt of the head in the left direction.

An image 82 indicating the front direction FC of the user is displayed by a cross image having arrows in the four directions (up, down, right, and left). The display of the vertical and lateral directions, while not necessarily required, is provided to the front direction FC for the purpose of better understanding of the relation with the target direction TG.

FIG. 16 illustrates a display example in which a degree of matching related to the direction is fed back in the image 81 including the roll information and indicating the target direction TG and the image 82 indicating the front direction FC of the user.

A of FIG. 16 illustrates a feedback display example in a case where the direction is approached.

B of FIG. 16 illustrates feedback display example in a case where the direction is matched.

In a case where the direction is approached, the display control unit 55 changes the display such that a shadow (gradation) is added to the periphery of the large circle of the image 81 illustrating the target direction TG as illustrated in A of FIG. 16.

Then, in a case where the direction is matched, the display control unit 55 changes the color of the inner portion (inner circumference) of the large circle of the image 81 illustrating the target direction TG into a predetermined color (for example, black to red) different from a normal color as illustrated in B of FIG. 16.

FIG. 17 illustrates a display example in which a degree of matching related to the roll is fed back in the image 81 illustrating the target direction TG also containing the roll information and the image 82 illustrating the front direction FC of the user.

A of FIG. 17 illustrates a feedback display example in a case where the roll is approached.

B of FIG. 17 illustrates a feedback display example in a case where the roll is matched.

In a case where the roll is approached, the display control unit 55 changes the display such that a cross having arrows of four directions of the image 82 illustrating the front direction FC of the user and the shadow (gradation) art attached to the periphery of the small circle as illustrated in A of FIG. 17.

In a case where the roll is matched, the display control unit 55 changes the colors of the cross having arrows in the four direction of the image 82 illustrating the front direction FC of the user and the small circle to a predetermined color (for example, black to red) different from a normal color as illustrated in B of FIG. 17.

Figure 18:
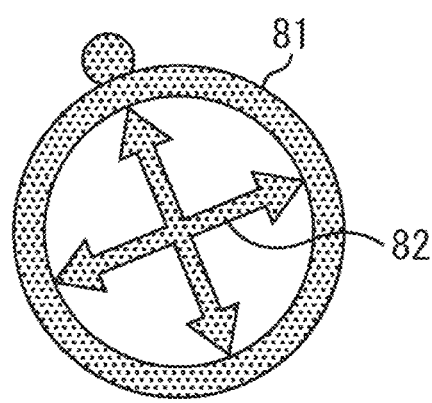
FIG. 18 is a diagram illustrating a feedback display example in a case where both the roll and the direction are matched.

FIG. 18 illustrates a feedback display example in a case where both the roll and the direction are matched.

In a case where both the roll and the direction are matched, the images illustrated in B of FIG. 16 and B of FIG. 17 are mixed and displayed. In other words, as illustrated in FIG. 18, the colors of the inner portion (inner periphery) of the large circle of the image 81 indicating the target direction TG and the small circle, and the cross having arrows of the four directions of the image 82 indicating the front direction FC of the user are changed to a predetermined color (for example, black to red) different from a normal color.

In this way, the display control unit 55 can change the display in a case where the image 81 indicating the target direction TG and the image 82 indicating the front direction FC of the user are displayed together with the roll information, or a case where only the direction is matched, a case where only the roll is matched, or a case where both the direction and the roll are matched.

<4. Second Embodiment of HRTF Measurement System>

Next, a second embodiment of the HRTF measurement system will be described.

<System Configuration Example>

Figure 19:
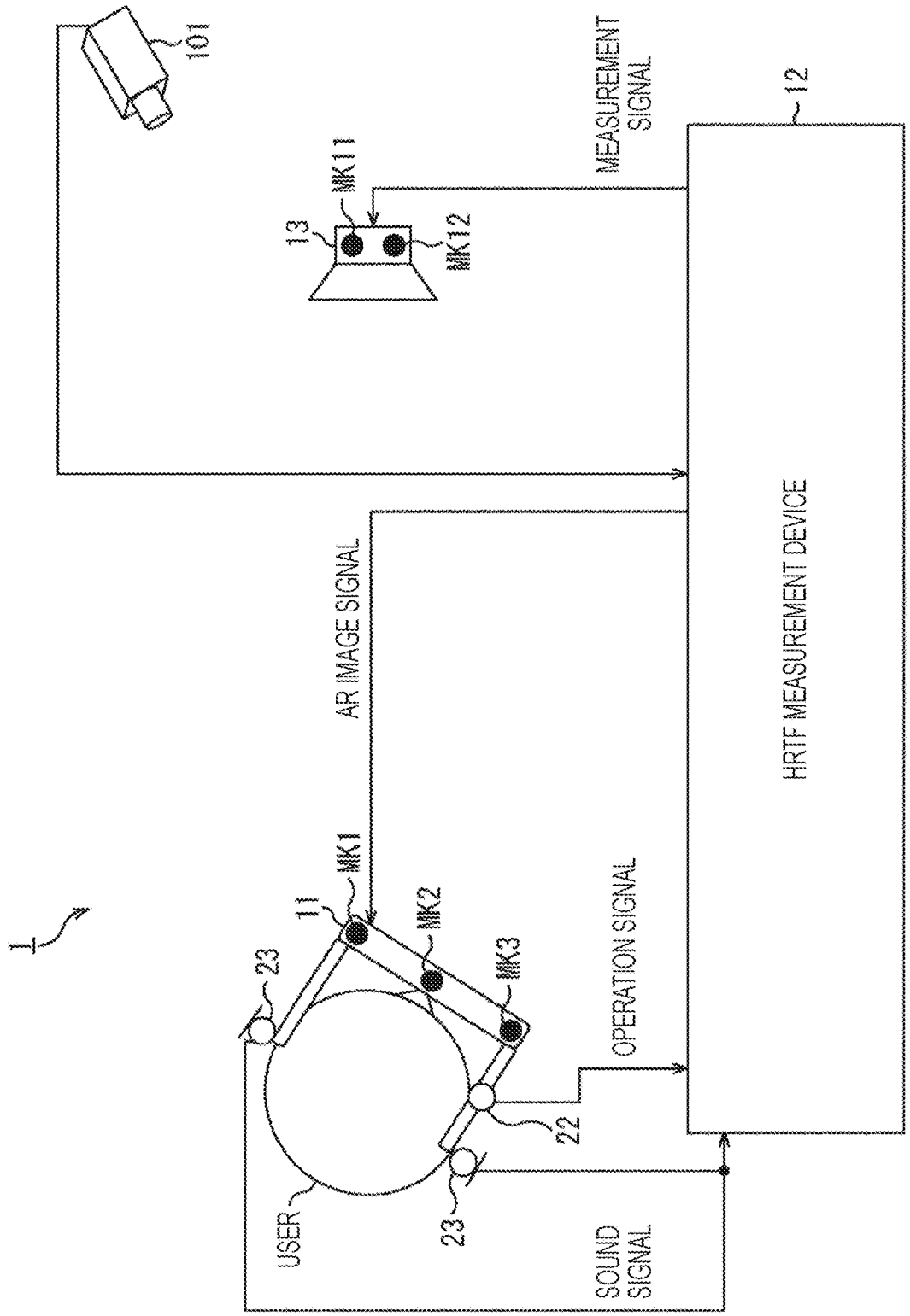
FIG. 19 is a diagram illustrating a configuration of a second embodiment of an HRTF measurement system to which the present technology is applied.

FIG. 19 illustrates a configuration of the second embodiment of the HRTF measurement system to which the technology of the present disclosure is applied.

Further, in the description of the second embodiment, the common description to the above-described first embodiment is appropriately omitted, and the different portions from the first embodiment will be described. In the drawings in the second embodiment, the portion corresponding to the first embodiment will be attached with the same symbol.

In the HRTF measurement system 1 according to the second embodiment, a camera 101 is newly provided in addition to the AR glasses 11, the HRTF measurement device 12, and the speaker 13.

In the AR glasses 11 according to the second embodiment, there are attached with a plurality of markers MK which can be captured (recognized) by the camera 101. In the example of FIG. 19, three markers MK1 to MK3 are attached to the AR glasses 11. In addition, the angle sensor 21 is omitted in the AR glasses 11.

Similarly, the speaker 13 according to the second embodiment is also attached with the plurality of markers MK which can be captured (recognized) by the camera 101. In the example of FIG. 19, two markers MK11 and MK12 are attached to the speaker 13.

The camera 101 includes an image capturing element, for example, a complementary metal oxide semiconductor (CMOS) sensor, a charge coupled device (CCD), or the like captures the images of three markers MK1 to MK 3 attached to the AR glasses 11 and two markers MK11 and MK12 attached to the speaker 13, and supplies the captured images obtained from the result to the HRTF measurement device 12. The camera 101 may be a stereo camera in which two image capturing elements are disposed with a predetermined gap therebetween.

In the second embodiment, the HRTF measurement device 12, the speaker 13, and the camera 101 may be configured as an integrated device. The device integrated with these components may be realized by a smart phone or a personal computer for example. In a case where the HRTF measurement device 12, the speaker 13, and the camera 101 are integrally configured, two markers MK11 and MK12 are omitted.

<Block Diagram of Detailed Configuration of HRTF Measurement System>

Figure 20:
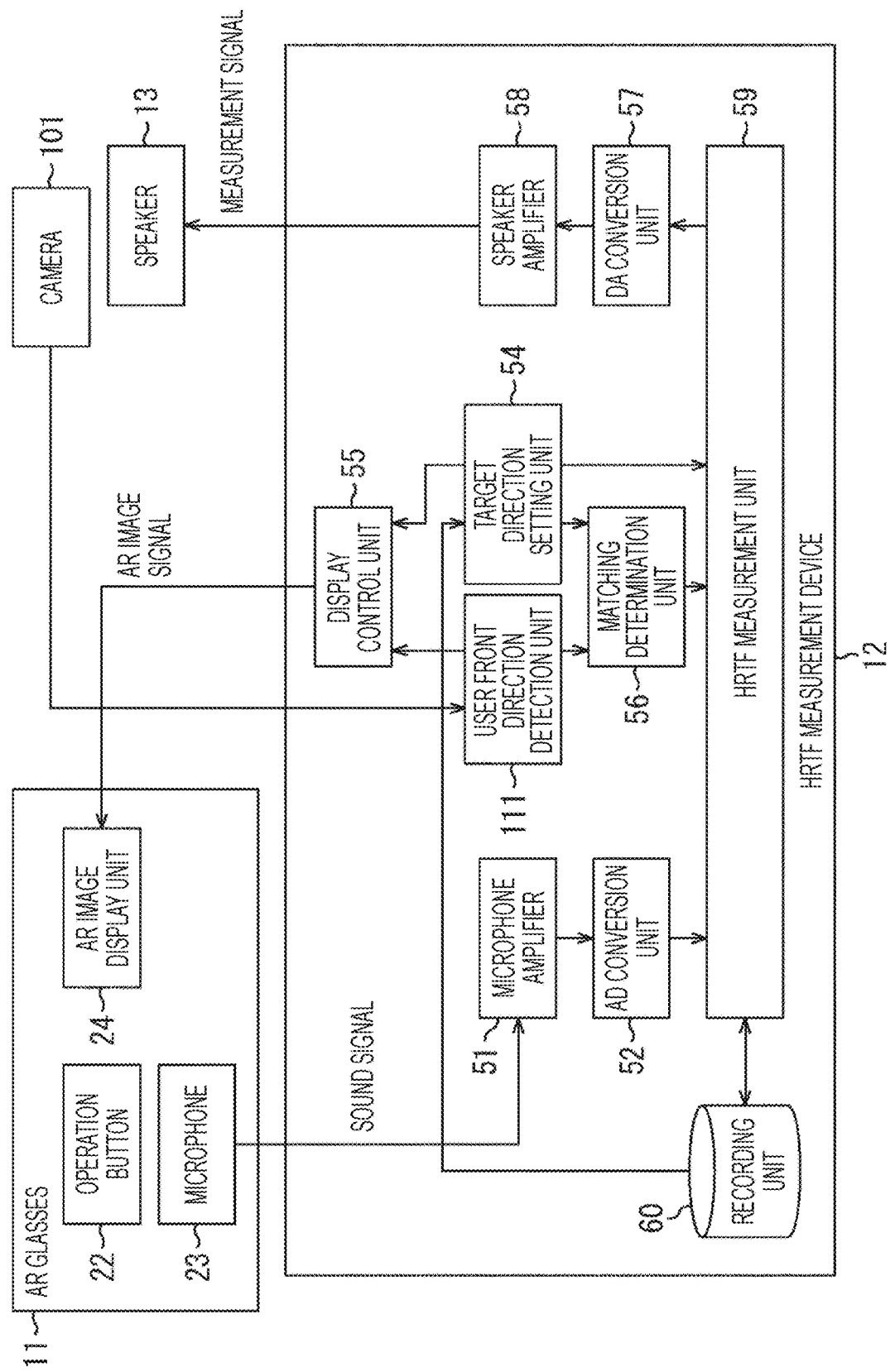
FIG. 20 is a block diagram illustrating a detailed configuration of the HRTF measurement system of the second embodiment.

FIG. 20 is a block diagram illustrating a detailed configuration example of the HRTF measurement system 1 according to the second embodiment.

Comparing FIG. 20 with FIG. 9 in the first embodiment, the angle sensor 21 is omitted in the AR glasses 11. In addition, in the HRTF measurement device 12, the user front direction detection unit 53 in the first embodiment is replaced with a user front direction detection unit 111. In addition, as described above, the camera 101 is added.

In the user front direction detection unit 111 of the HRTF measurement device 12, the image captured by the camera 101 (captured image).

The user front direction detection unit 111 detects three markers MK1 to MK3 attached to the AR glasses 11 which are contained in the captured image supplied from the camera 101, and two markers MK11 and MK12 attached to the speaker 13.

Then, the user front direction detection unit 111 calculates the position of the AR glasses 11 on a three-dimensional coordinate system with a predetermined position as the origin point on the basis of the three detected markers MK1 to MK3. The position of the AR glasses 11 is equal to the position of the head of the user who wears the AR glasses 11. Similarly, the user front direction detection unit 111 calculates the position of the speaker 13 on the three-dimensional coordinate system on the basis of the two detected markers MK11 and MK12.

Further, the user front direction detection unit 111 detects (calculates) the front direction FC that the user faces with respect to the position of the speaker 13 from the position of the AR glasses 11 and the position of the speaker 13 which are obtained by calculation, and supplies the front direction to the display control unit 55 and the matching determination unit 56.

In addition, the user front direction detection unit 111 also calculates a distance from the speaker 13 to the user from the position of the AR glasses 11 and the position of the speaker 13 which are obtained by calculation, and supplies the calculated distance to the display control unit 55 and the matching determination unit 56.

Further, when the position of the AR glasses 11 and the distance is calculated with respect to the position of the speaker 13, a position/posture estimation technique such as a simultaneously localization and mapping (SLAM) may be used.

In the target list stored by the recording unit 60 in the second embodiment, the plurality of target directions TG with respect to a predetermined reference direction BL and the distance (hereinafter, referred to as target distance) from the speaker 13 to the user are recorded.

<Flowchart of HRTF Measurement Process>

Figure 21:
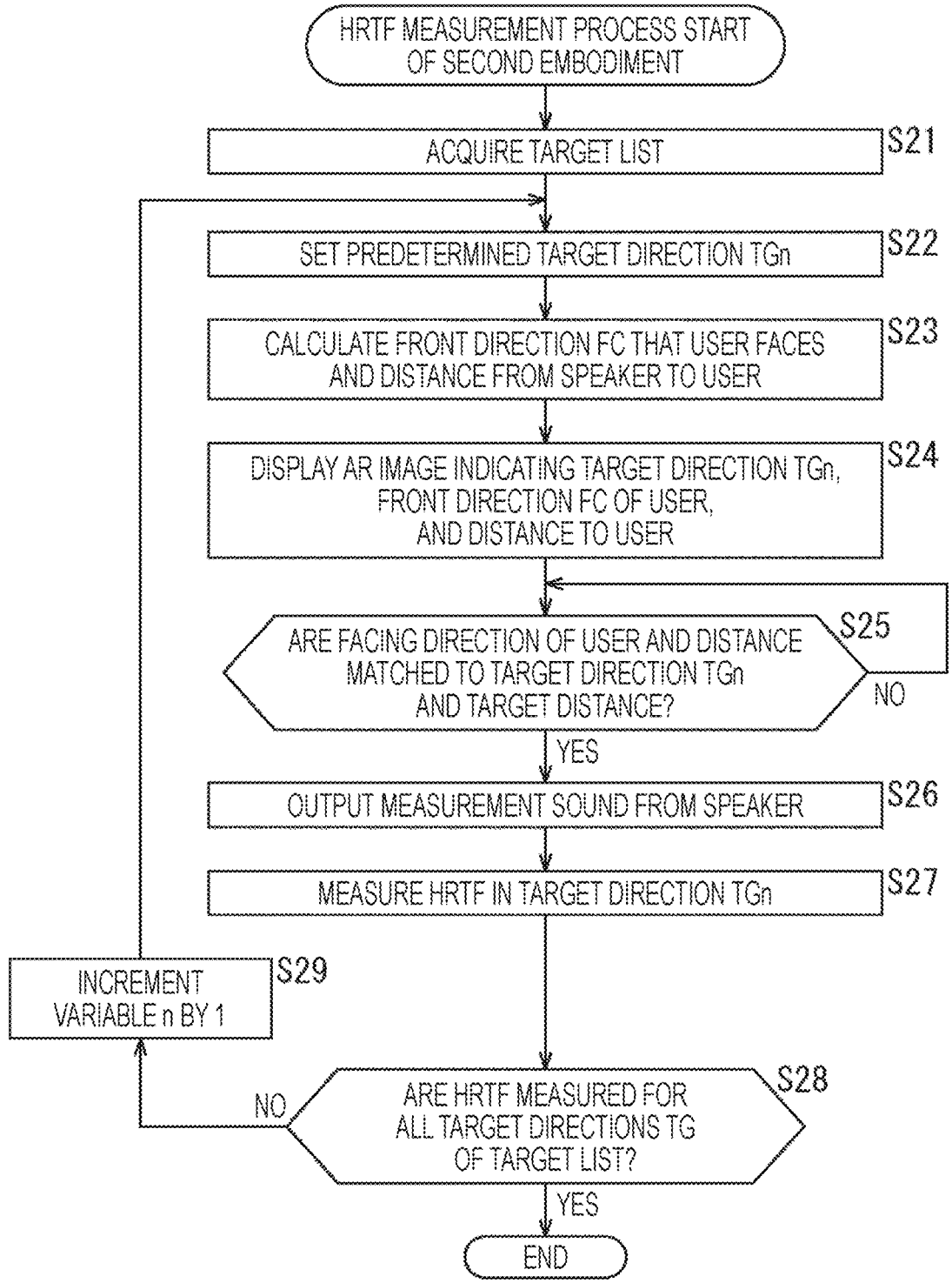
FIG. 21 is a flowchart for describing an HRTF measurement process of the second embodiment.

Next, the HRTF measurement process of the HRTF measurement system 1 according to the second embodiment will be described with reference to a flowchart of FIG. 21. This process starts, for example, when the user (measurement subject) wears the AR glasses 11 and presses the operation button 22 to give an instruction on the start of measurement.

First, in step S21, the target direction setting unit 54 acquires the target list recorded in the recording unit 60. In the target list of the second embodiment, as described above, the plurality of target directions TG and the target distance from the speaker 13 to the user are recorded.

In step S22, the target direction setting unit 54 sets a predetermined target direction TGn (n=1, 2, 3, . . . ) on the basis of the acquired target list.

Further, in step S22 immediately after the reference direction BL is set, a variable n to designate the predetermined target direction TGn among the plurality of target directions TG listed in the target list is set to 1. Therefore, in the first step S22, the target direction TG1 is set.

In step S23, the user front direction detection unit 111 calculates the front direction FC that the user faces and the distance from the speaker 13 to the user with respect to the position of the speaker 13 on the basis of the captured image supplied from the camera 101.

More specifically, the user front direction detection unit 111 detects three markers MK1 to MK3 attached to the AR glasses 11 which are contained in the image captured by the camera 101, and the positions of two markers MK11 and MK12 attached to the speaker 13. Then, the user front direction detection unit 111 calculates the front direction FC that the user faces with respect to the position of the speaker 13 on the basis of the positions of the three detected markers MK1 to MK3 and the two detected markers MK11 and MK12. In addition, the user front direction detection unit 111 also calculates the distance from the speaker 13 to the user. The calculated front direction FC of the user and the calculated distance up to the user are supplied to the display control unit 55 and the matching determination unit 56.

In step S24, the display control unit 55 generates the AR image indicating the target direction TGn, the front direction FC of the user, and the distance up to the user on the basis of the set target direction TGn and the front direction FC of the user and the distance up to the user supplied from the user front direction detection unit 111, and supplies the AR image signal to the AR image display unit 24. The AR image display unit 24 of the AR glasses 11 displays the AR image which indicates the target direction TGn, the front direction FC of the user, and the distance up to the user.

In step S25, the matching determination unit 56 determines whether the facing direction and the distance of the user are matched to the target direction TGn and the target distance on the basis of the front direction FC of the user and the distance up to the user supplied from the user front direction detection unit 111, and the target direction TGn of the user which are set by the target direction setting unit 54 and the target distance.

In step S25, in a case where it is determined that an angle difference between the front direction FC and the target direction TGn of the user falls within a predetermined range, it is determined that the facing direction of the user and the target direction TGn are matched. In addition, regarding the distance up to the user, in a case where it is determined that a distance difference between the distance up to the user supplied from the user front direction detection unit 111 and the target distance falls within a predetermined range, it is determined that the distance from the speaker 13 to the user is matched to the target distance.

In step S25, in a case where the facing direction and the distance of the user are not matched to the target direction TGn and the target distance, the process returns to step S25. With this configuration, the AR image indicating the target direction TGn, the front direction FC of the user, and the distance up to the user is updated until it is determined that the facing direction the distance of the user are matched to the target direction TGn and the target distance, and displayed in the AR glasses 11.

Then, in step S25, in a case where it is determined that the facing direction and the distance of the user is matched to the target direction TGn and the target distance, the process proceeds to step S26. The matching determination unit 56 supplies the determination result indicating the matching to the HRTF measurement unit 59. The HRTF measurement unit 59 outputs the measurement sound from the speaker 13. In other words, the HRTF measurement unit 59 supplies the measurement signal acquired from the recording unit 60 to the DA conversion unit 57. The measurement signal is subjected to the DA conversion and amplified, supplied to the speaker 13, and output from the speaker 13 as the measurement sound.

Next, in step S27, the HRTF measurement unit 59 acquires the sound signal of the measurement sound detected by the microphone 23 of the AR glasses 11, and measures the HRTF in the target direction TGn. In other words, the HRTF measurement unit 59 acquires the sound signal of the measurement sound supplied through the microphone amplifier 51 and the AD conversion unit 52 from the microphone 23 of the AR glasses 11, and calculates the impulse response by performing analysis using an inverse function, and records the impulse response in the recording unit 60.

In step S28, the HRTF measurement unit 59 determines whether the HRTF is measured for all the target directions of the target list.

In step S28, in a case where it is determined that the HRTF is not determined with respect to all the target directions TG of the target list, the process proceeds to step S29. The target direction setting unit 54 increments the variable n designating the target direction TGn by 1. Thereafter, the process returns to step S22. In step S22, the updated target direction TGn is set, and the subsequent processes are repeated.

On the other hand, in a case where it is determined that the HRTF is measured for all the target directions TG of the target list in step S28, the HRTF measurement process ends.

In the HRTF measurement process in the above second embodiment, the position of the user with respect to the speaker 13 can be detected on the basis of the captured image supplied from the camera 101. Therefore, the process of setting the reference direction to set the reference direction BL with respect to the speaker 13 is omitted which is performed in steps S2 to S4 of the HRTF measurement process of the first embodiment.

The HRTF measurement system 1 performs the HRTF measurement process as described above, so that a desired HRTF can be measured only using one fixed speaker 13.

With this configuration, the HRTF of all the periphery dedicated to an individual can be simply acquired only by one speaker 13. Therefore, it is possible to more simply acquire the HRTF of an individual.

According to the second embodiment, the HRTF can be measured while not only matching the front direction FC that the user faces to the target direction TG but also matching the distance from the speaker 13 to the user to the plurality of target directions TG. With this configuration, the HRTF can be measured with higher accuracy more than the case of the first embodiment.

Further, in the second embodiment, the user front direction detection unit 111 detects the positions (including the directions) of the user (the AR glasses 11 that the user wears) and the speaker 13 and the distance on the basis of the marker MK contained in the image captured by the camera 101. However, the method of detecting the positions of the user and the speaker 13 and the distance is not limited thereto.

For example, a detection device may be used which detects the positions of the user and the speaker 13 and the distance, for example, a method of measuring the distance using a ToF sensor which measures a distance up to a subject using thermography or a time of flight (ToF) method, a structure light method, and the like. In addition, the position and the distance may be separately detected by different devices.

In addition, in the second embodiment, the user is induced to match not only the target direction to the plurality of target directions TG stored in the target list but also the distance up to the speaker 13. However, it may be performed the control not to match the distance up to the speaker 13. In this case, the HRTF measurement unit 59 stores the distance up to the speaker 13 when the HRTF of each target direction TGn is measured in the recording unit 60 together with the measurement result of the HRTF. In the process after measurement, the correction of the HRTF may be performed to adjust a time difference according to the distance difference when the HRTF of each target direction TGn is measured.

In the target list, the plurality of target directions TG with respect to the predetermined reference direction BL and the distance from the speaker 13 to the user are recorded. However, similarly to the first embodiment, the distance up to the user may be omitted. In this case, in the HRTF measurement process of FIG. 21, for example, the HRTF in each target direction TG can be measured in accordance with the distance with respect to the distance when the first target direction TG1 is measured.

On the contrary, when a plurality of distances from the speaker 13 to the user is stored in the recording unit 60, the HRTF dedicated to the user may be measured for the plurality of different distances.

<Display Example of AR Image>

Next, a display example of the AR image displayed in the AR glasses 11 in the HRTF measurement process of the second embodiment will be described.

In the second embodiment, not only the target direction TG but also the distance up to the speaker 13 can be detected. Therefore, the distance up to the speaker 13 can be displayed to induce the user in the AR image displayed in the AR glasses 11.

Figure 22:
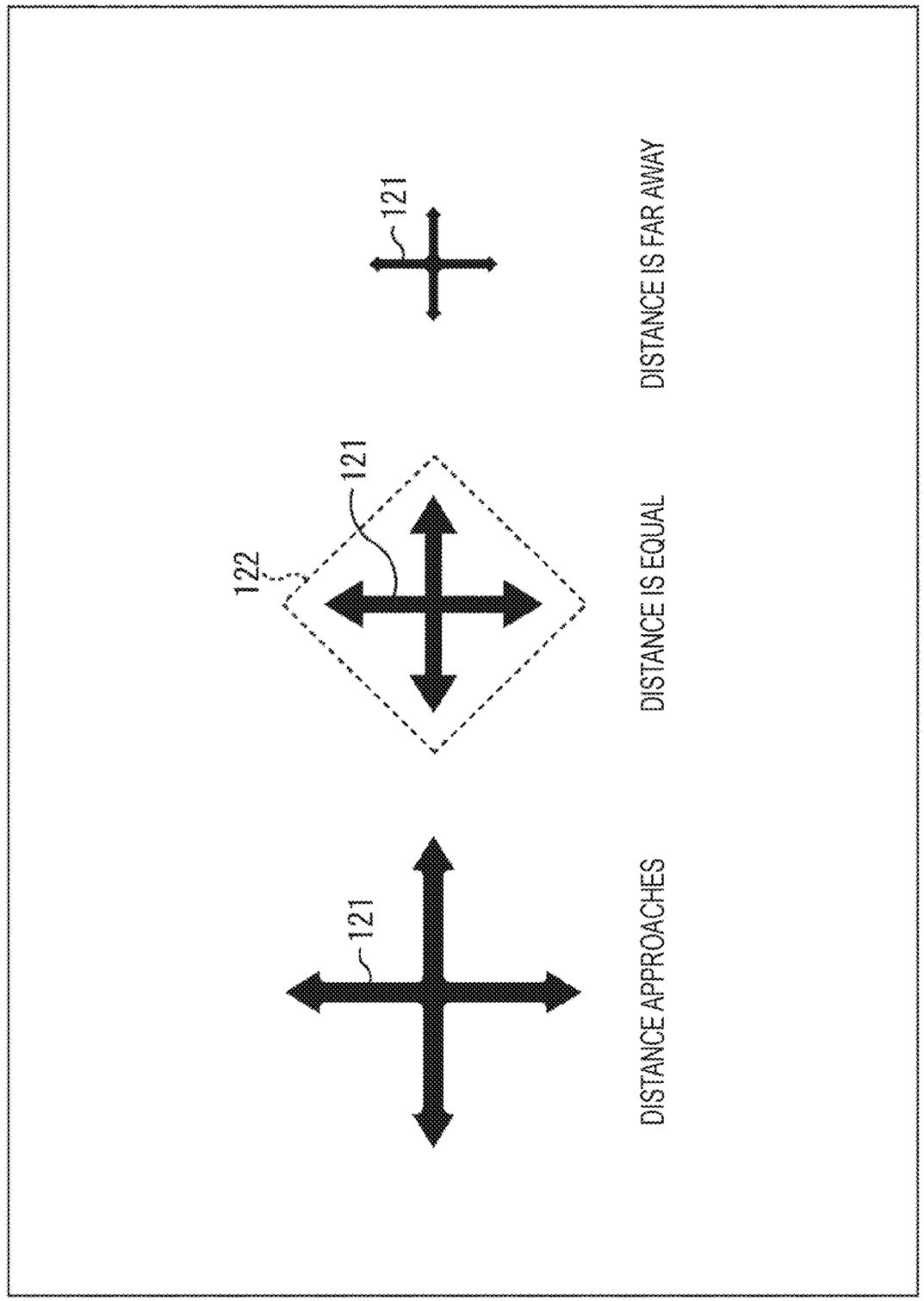
FIG. 22 is a diagram illustrating a display example where distance information is fed back.

FIG. 22 illustrates an example of the image indicating the front direction FC of the user which feeds back the distance information up to the speaker 13 to the user.

The display control unit 55 displays an image 121 indicating the front direction FC of the user using a cross having arrows in the four directions (up, down, right, and left) on an enlarged scale as illustrated in FIG. 22 in a case where the current distance of the user is shorter that the target distance where the HRTF measurement is performed (the distance to the speaker 13 is near). In a case where the current distance of the user is long (the distance to the speaker 13 is far), the image 121 indicating the front direction FC of the user is displayed on a reduced scale.

On the other hand, the display control unit 55 additionally displays, for example, a square 122 depicted by a broken line to the image 121 indicating the front direction FC of the user using a cross having arrows in the four directions (up, down, right, and left) in a case where a difference between the current distance of the user and the target distance falls within a predetermined range, and the current distance of the user is equal to the target distance (the distance to the speaker 13 is equal).

Further, the size of the image 121 indicating the front direction FC of the user in a case where the current distance of the user and the target distance are equal is the same as, for example, the size of the image 121 indicating the front direction FC of the user in a case where the distance information is not contained as illustrated in FIG. 15.

In the second embodiment, not only the direction (angle) with respect to the position of the speaker 13 but also the position of the vertical and lateral directions can also be detected. Therefore, it is possible to display not only the target direction TG but also the position of the vertical and lateral directions for induction.

Figure 23:
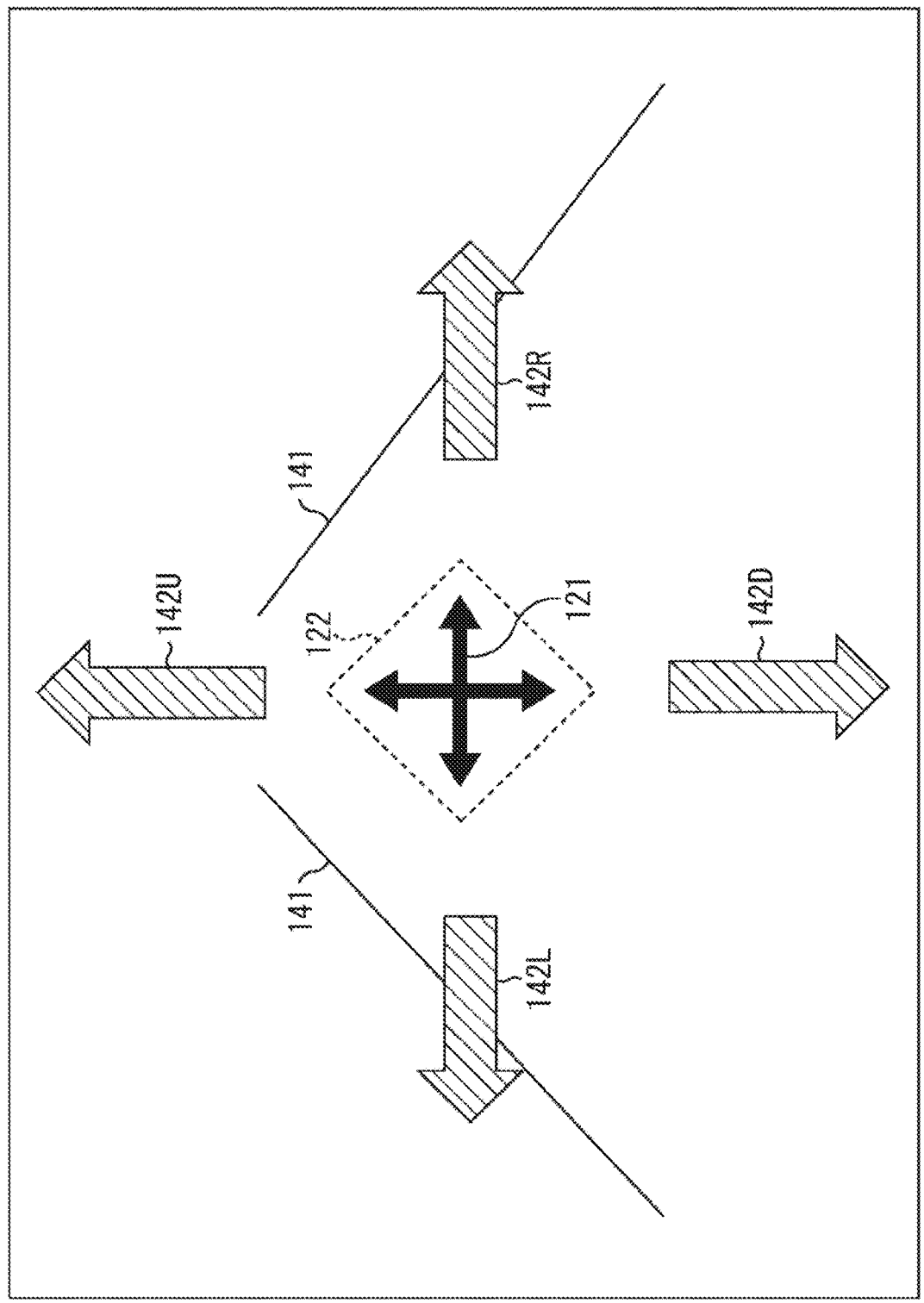
FIG. 23 is a diagram illustrating a display example where position information of the vertical and lateral directions is fed back.

FIG. 23 illustrates a display example in a case where the position information of the vertical and lateral directions of the user with respect to the speaker 13 is fed back to the user.

In a case where the position information of the vertical and lateral directions of the user with respect to the speaker 13 is fed back to the user, as illustrated in FIG. 23, the display control unit 55 displays the AR image added with two diagonal lines 141 expressing the depth on the outer side of the image 121 indicating the front direction FC of the user. The two diagonal lines 141 express that a move command to the user is not a rotation operation but a parallel movement operation.

Then, in a case where the position of the vertical and lateral directions of the user is deviated, the display control unit 55 displays any one of an image 142U of an up arrow, an image 142D of a down arrow, an image 142R of a right arrow, and an image 142L of a left arrow corresponding to the direction of correcting the deviation on the outer side of the image 121 indicating the front direction FC of the user. Further, in the example of FIG. 23, the square 122 of a broken line is also displayed on the outer side of the image 121 indicating the front direction FC of the user as a display example in a case where the distance is equal.

In this way, in the second embodiment, the AR image containing the distance information up to the speaker 13 and the AR image containing the position information (up, down, right, and left) of the user with respect to the speaker 13 can also be displayed.

<5. Modifications>

Hereinafter, modifications of the above embodiments will be described.

In the above-described embodiments, for the sake of simplicity in the description, the description has been give about the measurement of the HRTF in the plurality of target angles (the target directions TG) on the horizontal plane passing the user's head (ear). However, the HRTF is actually measured for a number of target angles which are distributed in a spherical shape surrounding the user.

In a case where the present technology is applied, and the HRTF of a number of target angles distributed in a spherical shape is measured, the target angle or the target direction stored in the target list may be realized by being defined by two pieces of information of a horizontal angle and an elevation.

In addition, in a case where the roll (the tilt of the head in the horizontal direction) is also contained as a control target, the target angle is defined by two pieces of information of the horizontal angle and the elevation while the target direction is defined by three pieces of information of the horizontal angle, the elevation, and the roll. Even in one target direction, the HRTF of a different target angle can be measured by changing the roll.

In the above-described embodiments, the HRTF is measured in an order from the first target list TG1 from among the plurality of target lists TG1 to TGN stored in the target list, but the target direction TF may be selected randomly. In addition, the target directions TG may be not displayed one by one in the AR image, but the plurality of target directions may be displayed at the same time, so that the user may select a desired target direction TG.

The above-described HRTF measurement system 1 may be configured by a cloud computing system in which one or more devices share part of functions through a network to perform the process together. For example, the target list recorded in the recording unit 60 and the HRTF (measurement result) may be stored in an information processing device on a cloud.

In the above-described embodiments, thresholds for the target direction TG and the target distance are set in advance to measure far away, approaching, matching, or the like. However, the user may set the thresholds arbitrarily in a setting screen.

In addition, even in a case where the number of parameters to be fed back is so many that the user is confused, the feedback information may be displayed and selected (designated) as the AR image using the setting screen.

A display example of various types of AR images to feed back the position information and the direction information to the user are given as merely exemplary, and the invention is not limited thereto. In addition, the feedback information may be provided to the user with the field as described above the AR image, or provided using another modal such as sound or vibration, or may be provided in a combination thereof.

<6. Configuration Example of Computer>

A series of processes described above may be performed by hardware, or may be performed by software. In a case where a series of processes is performed by software, a program configuring the software is installed in the computer. Herein, examples of the computer include a microcomputer which is embedded in a dedicated hardware, or a general purpose personal computer which can perform various types of functions by installing various programs.

Figure 24:
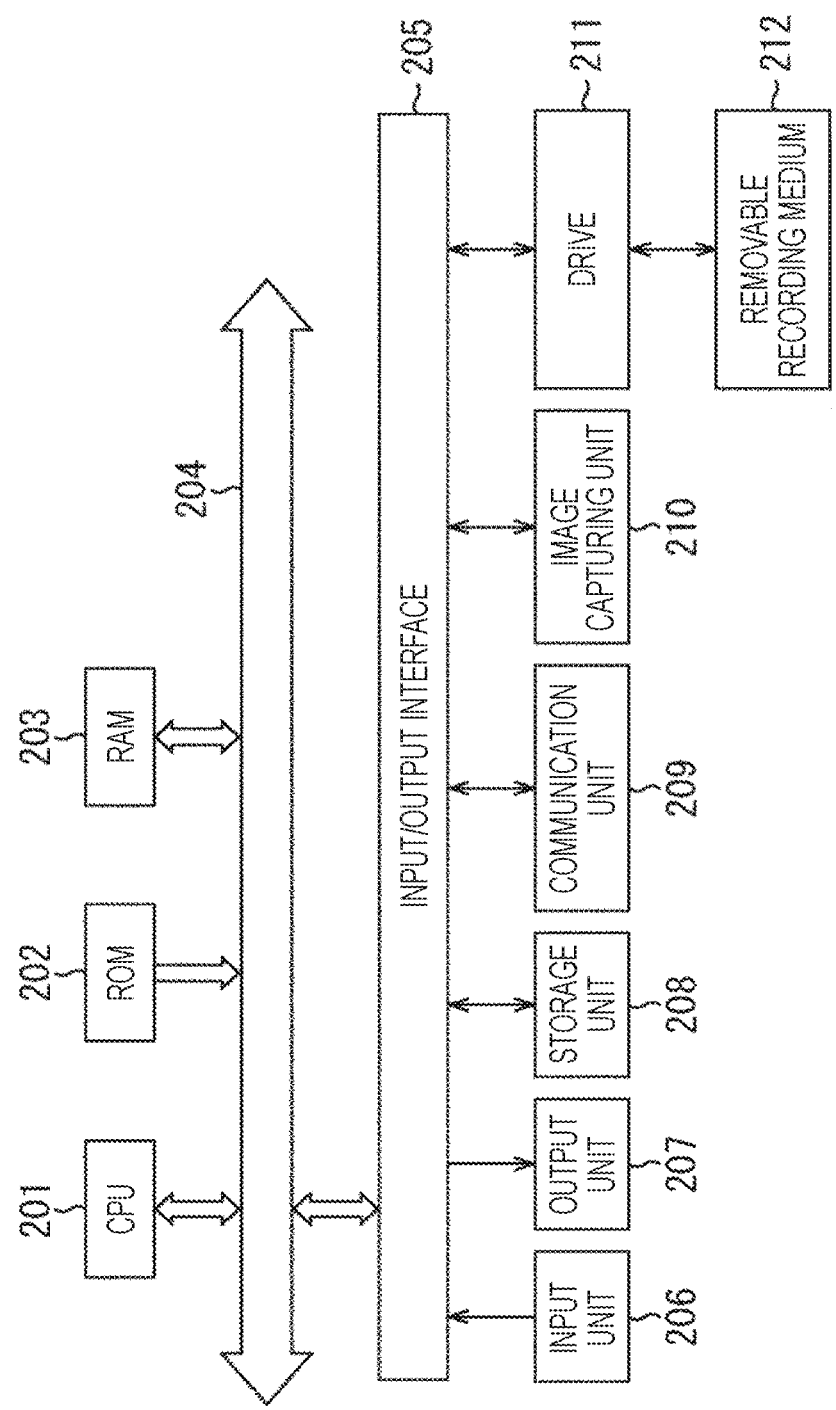
FIG. 24 is a block diagram illustrating a configuration example of an embodiment of a computer to which the present technology is applied.

FIG. 24 is a block diagram illustrating a hardware configuration example of the computer which performs a series of processes described above by a program.

In the computer, a central processing unit (CPU) 201, a read only memory (ROM) 202, a random access memory (RAM) 203 are connected to each other by a bus 204.

In the bus 204, an input/output interface 205 is further connected. In the input/output interface 205, an input unit 206, an output unit 207, a storage unit 208, a communication unit 209, and a drive 211 are connected.

The input unit 206 is configured by a keyboard, a mouse, a microphone, and the like. The output unit 207 is configured by a display, a speaker, and the like. The storage unit 208 is configured by a hard disk, a non-volatile memory, and the like. The communication unit 209 is configured by a network interface and the like.

An image capturing unit 210 is configured by a charge coupled device(CCD) and an image capturing element such as a complementary metal oxide semiconductor (CMOS) sensor. The image capturing unit 210 captures an image of a subject, and supplies the image data of the captured subject to the CPU 201 and the like through the input/output interface 205.

The drive 211 is driven by a removable recording medium 212 such as a magnetic disk, an optical disk, a magneto-optical disk, or a semiconductor memory.

In the computer configured as described above, the CPU 201 loads and performs the program stored in the storage unit 208 for example to the RAM 203 through the input/output interface 205 and the bus 204, so that a series of HRTF measurement processes described above is performed.

In the computer, the program can be installed in the storage unit 208 through the input/output interface 205 by mounting the removable recording medium 212 in the drive 211. In addition, the program is received by the communication unit 209 through a wired or wireless transmission medium such as a local area network, the Internet, or a digital satellite broadcasting system, and can be installed in the storage unit 208. Besides, the program may be installed in advance in the ROM 202 or the storage unit 208.

In this specification, the steps described in the flowchart may be performed time-sequentially according to the described order of course, or may not be necessarily performed time-sequentially. The steps may be performed in parallel or at required timing, for example, when being called.

In this specification, the system means a set of a plurality of components (devices, modules (parts), etc.) regardless of whether or not all the components are provided in the same housing. Therefore, the plurality of devices which are stored in separate housings and connected through the network, and one device in which a plurality of modules is stored in one housing may be a system.

Embodiments of the present technology are not limited to the above-described embodiments, and various changes can be made in a scope not departing from the spirit of the present technology.

For example, all or some of the plurality of embodiments may be combined.

For example, the present technology may be configured by a cloud computing system in which the plurality of devices shares one function through a network to perform the process together.

In addition, the steps described in the above flowchart may be being shared and performed by the plurality of devices instead of one device.

Further, in a case where the plurality of steps is contained in one step, the plurality of processes contained in one step may be shared and performed by the plurality of devices instead of one device.

Further, the effects described in this specification are given as merely exemplary, but the invention is not limited thereto. Effects other than the effects described in this specification may be achieved.

Further, the present technology may be configured as follows.

(1)

An HRTF measurement method including:

displaying, by an HRTF measurement device, an image indicating a target direction that a user is to face; and in a case where a front direction of the user and the target direction are matched, outputting a measurement sound from a speaker to measure an HRTF on the basis of a result of receiving the measurement sound through a microphone mounted on an ear of the user.

(2)

The HRTF measurement method according to (1), in which an image indicating the front direction of the user is displayed together with the image indicating the target direction.

(3)

The HRTF measurement method according to (1) or (2), in which the image of the target direction is displayed using a position of the speaker as a reference position.

(4)

The HRTF measurement method according to (3), in which the position of the speaker is displayed as the reference position to display the image indicating the target direction to the user.

(5)

The HRTF measurement method according to any one of (1) to (4), in which in a case where the target direction is out of a field of view of the user, an inducing image is displayed to induce the user to the target direction.

(6)

The HRTF measurement method according to any one of (1) to (5), in which a distance between the user and the speaker is measured to display an image indicating information about the distance.

(7)

The HRTF measurement method according to any one of (1) to (6), in which the image indicating the target direction or the image indicating the front direction of the user is changed according to a difference between the front direction of the user and the target direction.

(8)

The HRTF measurement method according to any one of (1) to (7), in which the image indicating the target direction includes information associated with a tilt of a head of the user in a horizontal direction.

(9)

The HRTF measurement method according to (8), in which an image to be displayed is different in a case where only the front direction of the user is matched to the target direction, a case where only the tilt of a head of the user in the horizontal direction is matched to the target direction, and a case where both the front direction of the user and the tilt of the head of the user in the horizontal direction are matched to the target direction.

(10)

The HRTF measurement method according to any one of (1) to (9), in which an image indicating a position of the user in vertical and lateral directions with respect to the speaker is displayed.

(11)

An HRTF measurement device including:

a display control unit which displays an image indicating a target direction that a user is to face; and an HRTF measurement unit which outputs a measurement sound from a speaker in a case where a front direction of the user and the target direction are matched, and measures an HRTF on the basis of a result of receiving the measurement sound through a microphone mounted on an ear of the user.

(12)

The HRTF measurement device according to (11), in which the display control unit displays an image indicating the front direction of the user together with the image indicating the target direction.

(13)

The HRTF measurement device according to (11) or (12) further including a user front direction detection unit which detects the front direction of the user on the basis of an angle detection signal detected by a device mounted on the user.

(14)

The HRTF measurement device according to (11) or (12) further including a user front direction detection unit which detects the front direction of the user on the basis of a detection result of a detection device which detects positions of the user and the speaker and a distance between the user and the speaker.

(15)

The HRTF measurement device according to (14), in which the detection device is an image capturing device which captures images of the user and the speaker, and the user front direction detection unit detects the front direction of the user on the basis of the images captured by the image capturing device.

(16)

The HRTF measurement device according to any one of (11) to (15), further including a recording unit which records information to specify the target direction.

(17)

The HRTF measurement device according to (16), in which the information to specify the target direction is at least one of the target direction or a target angle which is an angle of the HRTF intended to be measured.

(18)

The HRTF measurement device according to (16) or (17), in which the information to specify the target direction includes a distance from the speaker to the user.

(19)

A program which causes a computer to execute a process including:

displaying an image indicating a target direction that a user is to face; and in a case where a front direction of the user and the target direction are matched, outputting a measurement sound from a speaker to measure an HRTF on the basis of a result of receiving the measurement sound through a microphone mounted on an ear of the user.

REFERENCE SIGNS LIST

1 HRTF measurement system
11 AR glasses
12 HRTF measurement device
13 Speaker
21 Angle sensor
22 Operation button
23 Microphone
53 User front direction detection unit
54 Target direction setting unit
55 Display control unit
56 Matching determination unit
59 HRTF measurement unit
60 Recording unit
101 Camera
111 User front direction detection unit
201 CPU
202 ROM
203 RAM
206 Input unit
207 Output unit
208 Storage unit
209 Communication unit
210 Image capturing unit
211 Drive

The invention claimed is:

1. A head related transfer function (HRTF) measurement method comprising:

displaying, by an HRTF measurement device, an image indicating a target direction that a user is to face;

measuring a distance between the user and the speaker;

displaying an image indicating information about the distance;

the user activating an operation button disposed on an augmented reality device to control the HRTF measurement device to activate the HRTF measurement device; and in a case where a front direction of the user and the target direction are matched, outputting a measurement sound from a speaker to measure an HRTF on a basis of a result of receiving the measurement sound through a microphone mounted on an ear of the user;

wherein an image indicating the front direction of the user is displayed together with the image indicating the target direction;

wherein the image indicating the target direction is displayed using a position of the speaker as a reference position; and wherein the distance and the target direction each have an arbitrary threshold.

2. The HRTF measurement method according to claim 1, wherein the position of the speaker is displayed as the reference position to display the image indicating the target direction to the user.

3. The HRTF measurement method according to claim 1, wherein in a case where the target direction is out of a field of view of the user, an inducing image is displayed to induce the user in the target direction.

4. The HRTF measurement method according to claim 1, wherein
the image indicating the target direction or the image indicating the front direction of the user is changed according to a difference between the front direction of the user and the target direction.

5. The HRTF measurement method according to claim 1, wherein
the image indicating the target direction includes information associated with a tilt of a head of the user in a horizontal direction.

6. The HRTF measurement method according to claim 5, wherein
an image to be displayed is different in a case where only the front direction of the user is matched to the target direction, a case where only the tilt of a head of the user in the horizontal direction is matched to the target direction, and a case where both the front direction of the user and the tilt of the head of the user in the horizontal direction are matched to the target direction.

7. The HRTF measurement method according to claim 1, wherein
an image indicating a position of the user in vertical and lateral directions with respect to the speaker is displayed.

8. A head related transfer function (HRTF) measurement device comprising:
a display control circuitry which displays an image indicating a target direction that a user is to face;
HRTF measurement circuitry which outputs a measurement sound from a speaker in a case where a front direction of the user and the target direction are matched, measures an HRTF on a basis of a result of receiving the measurement sound through a microphone mounted on an ear of the user and measures a distance between the user and the speaker;
the display control circuitry displaying an image indicating information about the distance;
an operation button disposed on an augmented reality device and configured to be operated by the user that activates the HRTF measurement circuitry:
wherein the display control circuitry displays an image indicating the front direction of the user together with the image indicating the target direction;
wherein the display control circuitry displays an image of the target direction using a position of the speaker as a reference position; and
a user front direction detection circuitry which detects the front direction of the user on a basis of a detection result of a detection device which detects positions of the user and the speaker and the distance between the user and the speaker;
wherein the distance and the target direction each have an arbitrary threshold.

9. The HRTF measurement device according to claim 8, wherein
the user front direction detection circuitry further detects the front direction of the user on a basis of an angle detection signal detected by a device mounted on the user.

10. The HRTF measurement device according to claim 9, wherein
the detection device is an image capturing device which captures images of the user and the speaker, and
the user front direction detection circuitry detects the front direction of the user on a basis of the images captured by the image capturing device.

11. The HRTF measurement device according to claim 8, further comprising
a recording circuitry which records information to specify the target direction.

12. The HRTF measurement device according to claim 11, wherein
the information to specify the target direction is at least one of the target direction or a target angle which is an angle of the HRTF intended to be measured.

13. The HRTF measurement device according to claim 12, wherein the information to specify the target direction includes the distance from the speaker to the user.

14. A non-transitory computer readable storage medium having computer executable instructions stored thereon that, when executed by a computer, cause the computer to execute a process comprising:
displaying an image indicating a target direction that a user is to face;
measuring a distance between the user and the speaker;
displaying an image indicating information about the distance;
the user activating an operation button disposed on an augmented reality device to control A head related transfer function (HRTF) measurement device to activate the HRTF measurement device; and
in a case where a front direction of the user and the target direction are matched, outputting a measurement sound from a speaker to measure the HRTF on a basis of a result of receiving the measurement sound through a microphone mounted on an ear of the user;
wherein an image indicating the front direction of the user is displayed together with the image indicating the target direction;
wherein the image indicating of the target direction is displayed using a position of the speaker as a reference position; and
wherein the distance and the target direction each have an arbitrary threshold.

* * * * *